United States Patent
Dong et al.

(10) Patent No.: US 7,226,539 B2
(45) Date of Patent: Jun. 5, 2007

(54) BIONEST REACTOR FOR THE APPLICATION OF ANAEROBIC WASTEWATER TREATMENT AND BIOENERGY RECOVERY

(75) Inventors: Liangjie Dong, Beijing (CN); Ping-Yi Yang, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 93 days.

(21) Appl. No.: 10/858,819

(22) Filed: Jun. 1, 2004

(65) Prior Publication Data

US 2005/0011829 A1    Jan. 20, 2005

Related U.S. Application Data

(60) Provisional application No. 60/480,085, filed on Jun. 19, 2003.

(51) Int. Cl.
 *C02F 3/28* (2006.01)
(52) U.S. Cl. .................. 210/259; 210/603; 210/615
(58) Field of Classification Search ............... 210/603, 210/605, 615, 259, 903, 150, 151, 252; 435/174
See application file for complete search history.

(56) References Cited

U.S. PATENT DOCUMENTS

| | | | | |
|---|---|---|---|---|
| 3,347,381 A | * | 10/1967 | Minch et al. | 210/150 |
| 4,169,050 A | * | 9/1979 | Serfling et al. | 210/602 |
| 4,294,694 A | * | 10/1981 | Coulthard | 210/150 |
| 4,415,453 A | * | 11/1983 | Witt et al. | 210/615 |
| 4,551,250 A | * | 11/1985 | Morper et al. | 210/603 |
| 5,500,111 A | * | 3/1996 | Fujino | 210/150 |
| 5,637,219 A | * | 6/1997 | Robinson et al. | 210/603 |
| 6,019,900 A | * | 2/2000 | Brink et al. | 210/603 |
| 2005/0051482 A1 | * | 3/2005 | Austin | 210/619 |

FOREIGN PATENT DOCUMENTS

| | | | |
|---|---|---|---|
| JP | 62-36190 | * | 2/1987 |
| JP | 1-249189 | * | 10/1989 |
| JP | 8-309387 | * | 11/1996 |

OTHER PUBLICATIONS

Alphenaar et al. (2001). Anaerobic digestion of long-chain fatty acids in UASB and expanded granular sludge bed reactors. Abstract.
Batstone et al. (2001). Variation of bulk properties of anaerobic granules with wastewater type. *Water Research*, 35(7), 1723-1729.
Bellouti et al. (1997). Flocs vs granules: differentiation by fractal dimension. *Water Research*, 31(5), 1227-1231.

(Continued)

*Primary Examiner*—Fred G. Prince
(74) *Attorney, Agent, or Firm*—Knobbe Martens Olson & Bear LLP

(57) ABSTRACT

A method of treating wastewater using an anaerobic bioreactor which contains a "bio-nest" structure to retain the microbial content and improve digestion efficiency is disclosed. The bionest system results in a longer SRT, good sludge mixing, and reduced wash-out of sludge. The system is particularly useful for treatment of lipid rich wastewater such as dairy wastewater.

28 Claims, 23 Drawing Sheets

Bionest Anaerobic Two Stage Treatment

OTHER PUBLICATIONS

Chemicharo et al. (1999). Development and evaluation of a partitioned upflow anaerobic sludge blanket (UASB) reactor for the treatment of domestic sewage from small villages. *Wat. Sci. and Tech.*, 40(8), 107-113.

Cordoba et al. (1995) . Improved performance of a hybrid design over an anaerobic filter for the treatment of dairy industry wastewater at laboratory scale. *Journal of Fermentation and Bioengineering*, 79(3), 270-272.

Driessen et al. (1999). Anaerobic treatment of low, medium and high strength effluent in the agro-industry. *Wat. Sci. and Tech.*, 40(8), 221-228.

Fernandez et al. (2001). Anaerobic treatment of fibreboard manufacturing wastewaters in a pilot scale hybrid USBF reactor. *Wat. Res.*, 35(17), 4150-4158.

Frankin (2001). Full-scale experiences with anaerobic treatment of industrial wastewater. *Wat. Sci. Tech.*, 44(8), 1-6.

Gavala et al. (1999). Treatment of dairy wastewater using an upflow anaerobic sludge blanket reactor. *Journal of Agricultural Engineering Research*, 73(1), 59-63.

Hills et al. (1984). Effect of particle size on anaerobic digestion of tomato solid waste. *Agric. Wastes*, 10, 285-295.

Lettinga et al. (1980). Use of the upflow sludge blanket (USB) reactor concept for biological wastewater treatment. *Biotechnology and Bioengineering*, 22, 699-734.

Lettinga et al. (1997). Advanced anaerobic wastewater treatment in the near future. *Wat. Sci. and Tech.*, 35(10), 5-12.

Lettinga et al. (2001). Challenge of psychrophilic anaerobic wastewater treatment. *Trends in Biotechnology*, 19(9), 363-370.

Lettinga et al. , G., Hulshoff, P. L. W. (1991). UASB-process design for various types of wastewaters. *Water Sci. Technol.*, 24(8), 87-107.

Ligero et al. (2002). Sludge granulation during anaerobic treatment of pre-hydrolysed domestic wastewater, *Water SA*, 28(3), 307-311.

Malina et al. (1992). Design of anaerobic processes for treatment of industrial and municipal wastes, *Water Quality Management Library*, 7, 85.

Marin et al. (1999). Design and startup of an anaerobic fluidized bed reactor. *Wat. Sci. Tech.*, 40(8), 63-70.

Miron et al. (2000). The role of sludge retention time in the hydrolysis and acidification of lipids, carbohydrates and proteins during digestion of primary sludge in CSTR systems. *Water Res.*, 34(5), 1705-1713.

Nadais et al. (2001). Effects of organic, hydraulic and fat shocks on the performance of UASB reactors with intermittent operation. *Water Sci. Techno.*, 44(4), 49-56.

Pereboom (1994). Size distribution model for methanogenic granules from full scale UASB and IC reactors. *Water Science and Technology*, 30(12), 211-221.

Pereboom et al. (1994). Methanogenic granule development in full scale internal circulation reactors. *Water Science and Technology*, 30(8), 9-21.

Perle et al. (1995). Some biochemical aspects of the anaerobic degradation of dairy wastewater. *Water Research*, 29(6), 1549-1554.

Petruy et al. (1997). Digestion of a milk-fat emulsion, *Bioresource Technology*, 61(2), 141-149.

Sayed et al. (1987). Anaerobic treatment of slaughterhouse waste using a granular sludge UASB reactor. *Biol. Wastes*, 21(1), 11-28.

Uyanik et al. (2002). The effect of polymer addition on granulation in an anaerobic baffled reactor (ABR). Part I: process performance. *Wat. Res.*, 36(4), 933-943.

Uyanik et al. (2002). The effect of polymer addition on granulation in an anaerobic baffled reactor (ABR). Part II: compartmentalization of bacterial populations. *Wat. Res.*, 36, 944-955.

van Langerak et al. (1998). Effects of high calcium concentrations on the development of methanogenic sludge in upflow anaerobic sludge bed (UASB) reactors. *Wat. Res.*, 32(4), 1255-1263.

van Lier et al. (1997). High-rate anaerobic wastewater treatment under psychrophilic and thermophilic conditions. *Water Science and Technology*, 35(10), 199-206.

Vartak et al. (1997). Attached-film media performance in psychrophilic anaerobic treatment of dairy cattle wastewater. *Bioresource Technology*, 62(3), 79-84.

Vartak et al. (1998). Mesophilic performance of attached-film reactors subject to low temperature stress. *Trans ASAE*, 41(5), 1463-1468.

Vidal et al. (2000). Influence of the content in fats and proteins on the anaerobic biodegradability of dairy wastewaters. *Bioresource Technology*, 74(3), 231-239.

Vieira et al. (1992). Sewage treatment by UASB-reactor: Operation results and recommendations for design and utilization. *Water Sci. Technol.*, 25(7), 143-157.

Wiegant (2001). Experiences and potential of anaerobic wastewater treatment in tropical regions. *Water Sci. Technol*, 44(8), 107-113.

Wirtz et al. (1997). Laboratory studies on enhancement of granulation in the anaerobic sequencing batch reactor. *Water Science and Technology*, 36(4), 279-286.

Yu et al. (2001). Enhanced sludge granulation in upflow anaerobic sludge blanket (UASB) reactors by aluminum chloride. *Chemosphere*, 44(1), 31-36.

Yu et al. (2001). The roles of calcium in sludge granulation during UASB reactor start-up, *Wat. Res.*, 35(4), 1052-1060.

Zeeman et al. (1999). The role of anaerobic digestion of domestic sewage in closing the water and nutrient cycle at community level. *Water Sci. Technol,*. 39(5), 187-194.

Zeeman et al. (1997). Anaerobic treatment of complex wastewater and waste activated sludge—application of an upflow anaerobic solid removal (UASR) reactor for the removal and pre-hydrolysis of suspended COD. *Wat. Sci. and Tech.*, 35(10), 121-128.

Gavrilescu, M. 2002. Engineering concerns and new developments in anaerobic waste-water treatment. *Clean Techn. Environ. Policy*, 3:346-362.

Habets, et al. (1997). Anaerobic treatment of inuline effluent in an internal circulation reactor. *Water Science and Technology*, 35(10):189-197.

Hawkes, et al. 1995. Comparative performance of anaerobic digesters operating on ice-cream wastewater. *Wat. Res.*, 29(2):525-533.

Ince, O. 1998. Performance of a two-phase anaerobic digestion system when treating dairy wastewater. *Wat. Res.*, 32(9):2707-2713.

Jhung, et al. 1995. A comparative study of UASB and anaerobic fixed film reactors with development of sludge granulation. *Wat. Res.*, 29(1):271-277.

Lens, et al. 1998. Effect of staging on volatile fatty acid degradation in a sulfidogenic granular sludge reactor. *Water Research*, 32(4):1178-1192.

Rinzema, A. 1988. Anaerobic treatment of wastewater with high concentratoins of lipids or sulfate. (Abstract). Ph.D. dissertation No. 1240, Wageningen, Agric. Univ., The Netherlands.

Rinzema, et al. 1993. Anaerobic digestion of long-chain fatty acids in UASB and expanded granular sludge bed reactors. *Process Biochemistry*, 28(8):527-537.

International Search Report from co-pending PCT/US04/17307 dated Dec. 16, 2005.

Written Opinion of the International Searching Authority from co-pending PCT/USUS04/17307 dated Dec. 16, 2005.

\* cited by examiner

Bionest Material and Bionest Structure

Bionest Material Derived from Stainless Steel

Case 2
In flowing water, the gravity settling velocity and settling time:

Case1 (batch reactor completely mixed when feeding)
In steady water, the gravity settling velocity and settling time:

h is the effective height,
$v_t$ is the gravity settling velocity.

Aerobic post treatment (R3) process performance

| Period | TCOD Loading rate | HRT | TCOD | SCOD | TSS | TN | P |
|---|---|---|---|---|---|---|---|
| Unit | g/L/day | Hours | Removal efficiency | Removal efficiency | Removal efficiency | Removal efficiency | Removal efficiency |
| 1 | 2.51 | 18 | 71.00% | 62.00% | 62.1% | 59.0% | 65.0% |
| 2 | 2.42 | 13 | 68.00% | 51.00% | 55.2% | 52.0% | 63.0% |
| 3 | 7.10 | 7 | 55.00% | 37.00% | 46.1% | 48.0% | 54.1% |
| 4 | 17.84 | 4 | 45.00% | 21.00% | 42.0% | 45.0% | 50.0% |
| 5 | 29.07 | 4 | 35.00% | 18.00% | N/A | N/A | N/A |
| 6 | 39.64 | 3 | 26.00% | 15.10% | 32.0% | 30.1% | 30.0% |
| 7 | 65.66 | 3 | 18.00% | 11.10% | N/A | NA | NA |
| 8 | 17.49 | 4 | 52.00% | 41.10% | 45.0% | 46.0% | 52.2% |

Fig. 23

BIONEST REACTOR FOR THE APPLICATION OF ANAEROBIC WASTEWATER TREATMENT AND BIOENERGY RECOVERY

RELATED APPLICATIONS

This application claims priority under 35 U.S.C. §119 to U.S. Provisional Application No. 60/480,085, filed Jun. 19, 2003, the disclosure of which is hereby incorporated by reference in its entirety.

GOVERNMENT INTEREST IN THE INVENTION

Certain aspects of the invention disclosed herein were made with United States government support under USDA (U.S. Department of Agriculture) Grant No. HATCH-550. The United States government has certain rights in these aspects of the invention.

BACKGROUND OF THE INVENTION

1. Field of the Invention

The invention generally relates to the field of wastewater treatment. A method of treating wastewater using an anaerobic bioreactor which contains a "bio-nest" structure to retain the microbial content and improve digestion efficiency is disclosed. The system is particularly useful for treatment of lipid rich wastewater.

2. Description of the Related Art

Improvement of the wastewater treatment process, and in particular, dairy and agricultural wastewater treatment, is an important goal. This is particularly important since the U.S. Environmental Protection Agency (EPA) is putting new rules into place regarding agricultural waste. All large Concentrated Livestock Animal Feeding Operations (CAFOs) will soon be required to obtain permits that will ensure they protect America's waters by keeping wastewater and manure out of the nation's waterways. The rule will control runoff from agricultural feeding operations, preventing billions of pounds of pollutants from entering America's waters every year. Likewise, similar environmental quality issues are becoming increasingly important in other countries outside the United States as well. Accordingly, new methods for clearing wastewater of biological pollutants are needed in order for agricultural facilities to be compliant with the new ruling.

Conventional wastewater treatment facilities typically utilize an upflow anaerobic sludge blanket (UASB)-type system. The UASB high rate reactors are based on the difference of solid and liquid retention time by applying a "granule blanket" (Lettinga et al., 1980; Marin et al., 1999; each of which is incorporated by reference herein in its entirety). However, the UASB granule blanket reactors have some limitations because the granulation formulation depends on wastewater types rather than reactor design and operation (Jhung J. K. and Choi E. 1995, Batstone and Keller, 2001; each of which is incorporated by reference herein in its entirety). For example, granule formation can be difficult to form during UASB treatment of wastewater containing a high concentration of fat and lipids such as dairy wastewater (Hawkes et al., 1995). Accordingly, UASB methods of treating lipid-rich wastewater have often met with poor results (Hawkes et al., 1995, Perle et al. 1995, Petruy and Lettinga 1997, Vidal et al., 2000; each of which is incorporated by reference herein in its entirety).

The poor performance of UASB systems is often due to the binding of the wastewater lipids to the granules, causing breakdown of the granules. The broken down granules can then float and wash out of the system (Perle et al. 1995; Petruy and Leffinga, 1997). Further, Alphenaar and Lettinga (1993; the disclosure of which is incorporated by reference herein in its entirety) concluded that UASB reactors were not suitable to be applied if lipids contribute 50% or more of the chemical oxygen demand (COD) of wastewater. Lipid loading rates exceeding 2–3 kg COD m$^{-3}$ day$^{-1}$ caused granule breakdown resulting in total sludge wash-out. Even at lower loading rates (less than 1.5 g/l/d), the system was still unreliable because of unpredictable sludge flotation.

Conventional UASB systems often also have a "dead zone" or shortcut of wastewater flow (Lens et al, 1998). Although a relatively high organic loading rate (OLR) of more than 20 kg COD/m$^3$/day could be achieved in UASB systems with high strength wastewater (COD>2500 mg/l) on a laboratory scale, full scale UASB systems were generally designed not to exceed 15 kg/m$^3$/day at an optimum temperature 35° C. (Driessen and Yspeert, 1999; incorporated by reference herein in its entirety). Additional concerns with the UASB reactors include mass transfer limitations due to sub-optimal mixing condition inside the reactor, and high upflow velocity and gas production causing granules wash-out (Driessen and Yspeert, 1999). An increase in upflow velocity in such systems may cause too little contact time between the granule and the soluble substrate. Also, a substantial "dead zone" was present in the reactor, containing a low amount of sludge and/or poor mixing conditions (Lens et al, 1998, Chernicharo and Cardoso, 1999; each of which is incorporated by reference herein in its entirety).

UASB systems are often plagued with poor reliability, particularly when used for high lipid wastewater. In continuous UASB systems, the scum layer and sludge layer on the top of the reactor were subsequently washed out (Rinzema, 1988; Yang, 1994; each of which is incorporated by reference herein in its entirety). The solids content accumulated in the sludge bed, which led the poor reliability of operational performance. In order to solve these problems, several researchers (Sayed, 1987; Lettinga and Hulshoff Pol 1991; each of which is incorporated by reference herein in its entirety) suggested using the flocculants sludge instead of granules. Intermittent (rather than continuous) feeding operations were suggested (Nadais et al., 2001; the disclosure of which is incorporated by reference herein in its entirety).

Several UASB modifications, such as upflow anaerobic buffer reactors (UABR) and upflow anaerobic filter reactor results were reported for the application for treating milk wastewater (Hawkes et. al., 1995; Cordoba et. al., 1995; Vartak et. al., 1998; each of which is incorporated by reference herein in its entirety). Rather than granule blanket sludge, floc sludge was applied in these modified reactors. The main advantages of these modified reactors included the maintenance of a high sludge concentration and the prevention of sludge wash out by the use of filters, media and baffles.

The presence of a high lipid content in some types of wastewater has been found to cause the inhibition of methanogenic activity (Perle et al., 1995). This inhibition of methanogenic activity resulted in poor anaerobic biodegradation of fat and lipids in the wastewater.

An additional issue with conventional wastewater treatment systems is that some systems require a heating method to control the temperature for optimal performance, particularly for wastewater having a high lipid content. However, although heating the system may improve lipid biodegradation, the economic cost can be very high, particularly if an external heat source is not available (Petruy and Lettinga, 1997).

What is needed in the field of wastewater treatment is an alternative, reliable method to efficiently treat wastewater, particularly wastewater that is high in lipid content such as dairy wastewater.

SUMMARY OF THE INVENTION

Embodiments of the present invention provide a biological reactor for processing wastewater including at least one pollutant, the reactor including a housing and a nest material, wherein the housing includes a passage for flow of wastewater, the passage having a cross-sectional area and an axis parallel to a direction of flow, wherein nest material can be confined within a nest space in at least one position along the axis, and wherein the nest material includes a substantially planar filamentous structure that provides a surface for attachment of biomass while permitting flow of wastewater through the nest space. In some embodiments, the nest material can have a surface to volume ratio of at least about 10,000, or in other embodiments between about 30,000 and about 100,000. In preferred embodiments, the nest material can include polyvinylchloride and/or any other suitable material. In some embodiments, the nest material can include a thickness of less than about 100 microns, and in many embodiments less than about 50 microns. In preferred embodiments, the nest material can extend through substantially all of the cross sectional area of the passage within the nest space. In some embodiments, the nest material can retain substantially constant biomass at a hydraulic retention time between 10 and 30 h, and/or in presence of a high lipid wastewater. In preferred embodiments, the biomass can exist in association with the nest material at a concentration of at least about 10 g/l. In preferred embodiments, the nest material can be arranged in the nest space to create turbulence in wastewater passing through the nest space. In preferred embodiments, the biomass can include anaerobic bacteria. In preferred embodiments, the nest material can be confined in nest spaces at two or more positions along the axis. In some embodiments, the biological processing of a pollutant in the wastewater can substantially occur in two or more steps, each of the steps being predominant in one of the two or more nest spaces positioned along the axis. In preferred embodiments, the processing of a pollutant can include at least an acidogenic step and a methanogenic step, and the acidogenic step can be predominant in a first nest space and the methanogenic step can be predominant in a second nest space. In preferred embodiments, the reactor can have an overall void volume of at least about 85%, 90%, or greater.

In some embodiments, the reactor can include a bank of two or more housings, wherein wastewater can flow serially along a flow path through each housing in the bank. In preferred embodiments, each housing in the reactor can include at least one nest space. In some embodiments, the reactor can further include a plurality of banks of housings, wherein the banks can be arranged to permit parallel flow of wastewater in the banks, permitting multiplex passage of a large volume of wastewater through the reactor, such that substantially all of the wastewater can pass through the reactor with a substantially uniform hydraulic retention time. In some embodiments, the reactor can have an efficiency of removal of one or more organic pollutants of at least about 50% chemical oxygen demand (COD) removal at a loading rate of over 10 g/l/d and/or the efficiency can be at least about 40% chemical oxygen demand (COD) removal at a loading rate of over 20 g/l/d. In preferred embodiments, the efficiency can be between 50% and 85% COD removal at a loading rate of over 15 g/l/d.

In preferred embodiments, the biological processing of the wastewater can produce methane. In some embodiments, the production of methane can be at least 1 l/l/d at 22 degrees and 10 g/l/d. In other embodiments the production of methane can be at least 2 l/l/d. In some embodiments, the production of methane can result in an energy output/input ratio of 3:1 or less to 7:1, or more. In preferred embodiments, the production of methane can occur at a temperature below 25 degrees C.

Embodiments of the invention also provide methods for processing wastewater. Preferred methods include the steps of: directing wastewater including a first amount of at least one pollutant into a biological reactor, the reactor including a housing and a nest material, wherein the housing includes a passage for flow of wastewater, the passage having a cross-sectional area and an axis parallel to a direction of flow, wherein nest material can be confined within a nest space in at least one position along the axis, and wherein the nest material includes a substantially planar filamentous structure that provides a surface for attachment of biomass while permitting flow of wastewater through the nest space; flowing the wastewater through the nest material; recovering biogas from the reactor; and discharging processed water from the reactor, wherein the processed water can include a second amount of the at least one pollutant, and wherein the second amount is preferably lower than the first amount. In preferred embodiments, the wastewater can include water from a dairy and/or can include a lipid content of at least about 25% of total COD in the wastewater and/or a lipid content of between about 100 mg/l or less and about 2000 mg/l or greater. In preferred embodiments, the method can further include seeding the wastewater or the reactor with active biomass sludge. In some embodiments, the method can include a hydraulic retention time (HRT) of less than about 30 hours, and in preferred embodiments less than about 15 hours. In preferred embodiments, the method can include a ratio of solids retention time (SRT) to HRT of at least about 40:1, and in preferred embodiments between 100:1 and 250:1, or more. Likewise, the SRT can be substantially independent of HRT. In preferred embodiments, the reactor can reach a substantially steady state of biogas production within less than about 20 days from initiation. In preferred embodiments, the biomass can be distributed substantially homogeneously throughout the reactor. Variations on the methods and reactors useful in practicing the method include those summarized in connection with the summary of the bioreactor, above.

In other embodiments of the invention, there is provided a biological reactor for processing wastewater including at least one pollutant, the reactor including a housing and a nest material, wherein the housing includes a passage for flow of wastewater, the passage having a cross-sectional area and an axis parallel to a direction of flow, wherein nest material can be confined within a nest space in at least one position along the axis, wherein the nest material includes a structure that provides a surface for attachment of biomass while permitting flow of wastewater through the nest space, and wherein a surface to volume ratio of the nest material can be at least about 10,000. Variations on the methods and reactors useful in practicing the method include those summarized in connection with the summary of the other aspects and embodiments of the invention as set forth above.

BRIEF DESCRIPTION OF THE DRAWINGS

FIG. 23 is a table showing the aerobic reactor (R3) post treatment performance measurements.

DETAILED DESCRIPTION OF THE PREFERRED EMBODIMENT

Many of the problems encountered with conventional bioreactors can be at least partially overcome by use of the bionest bioreactor for processing wastewater according to methods of the invention. The bionest structure allows the digesting microorganisms to bind to or settle on a solid, stable surface, so that they are not washed out of the system along with the wastewater they are treating. In conventional methods, in contrast, the microorganisms themselves are often washed out of the system along with the waste and wastewater they are supposed to be digesting.

Figure 1:
FIG. 1 is a photograph showing an example of a bionest structure made from pieces of black tubing.
Figure 2:
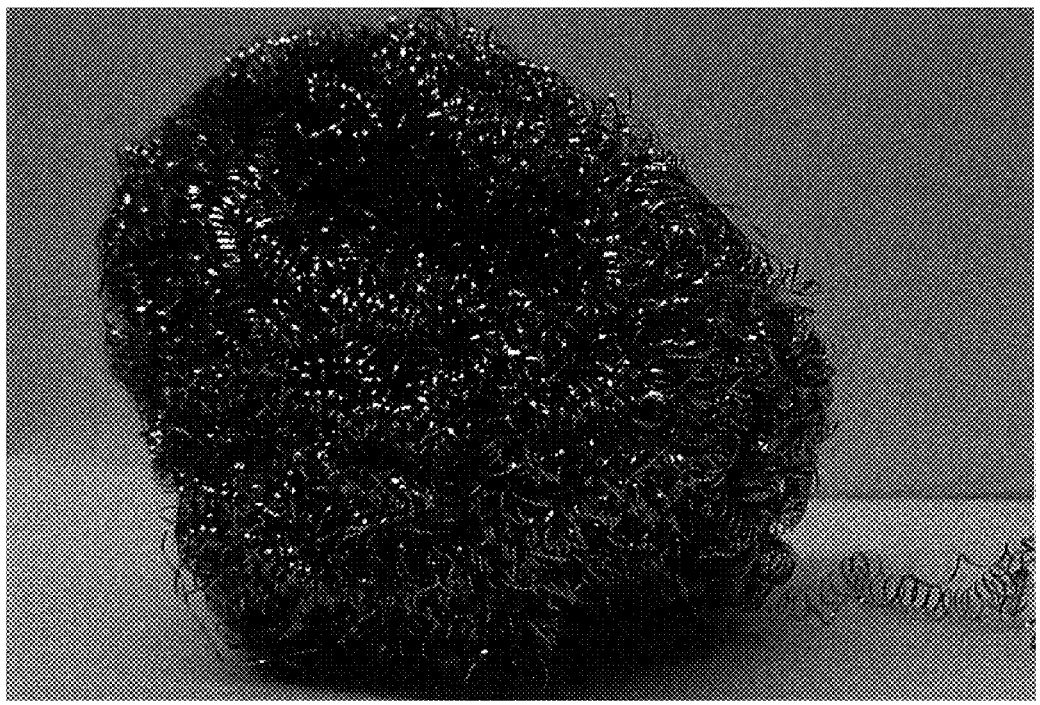
FIG. 2 is a photograph showing an example of a bionest structure made from a metallic material.
Figure 3:
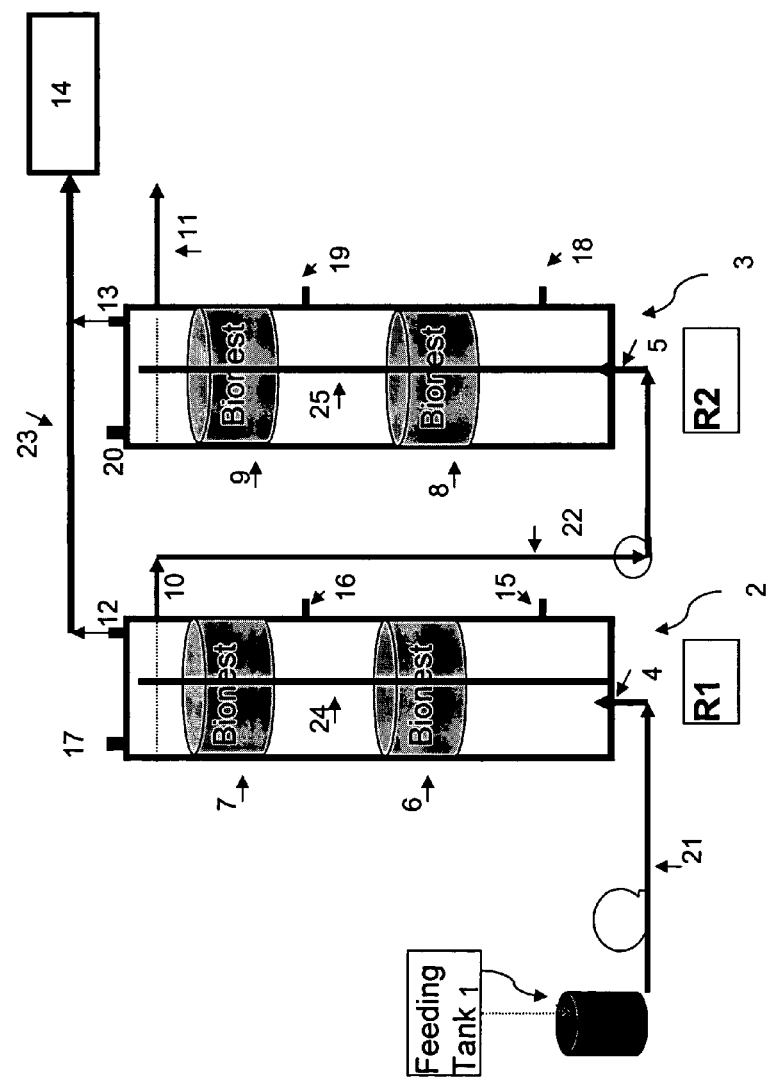
FIG. 3 is a diagram of a two-stage bionest reactor.
Figure 4:
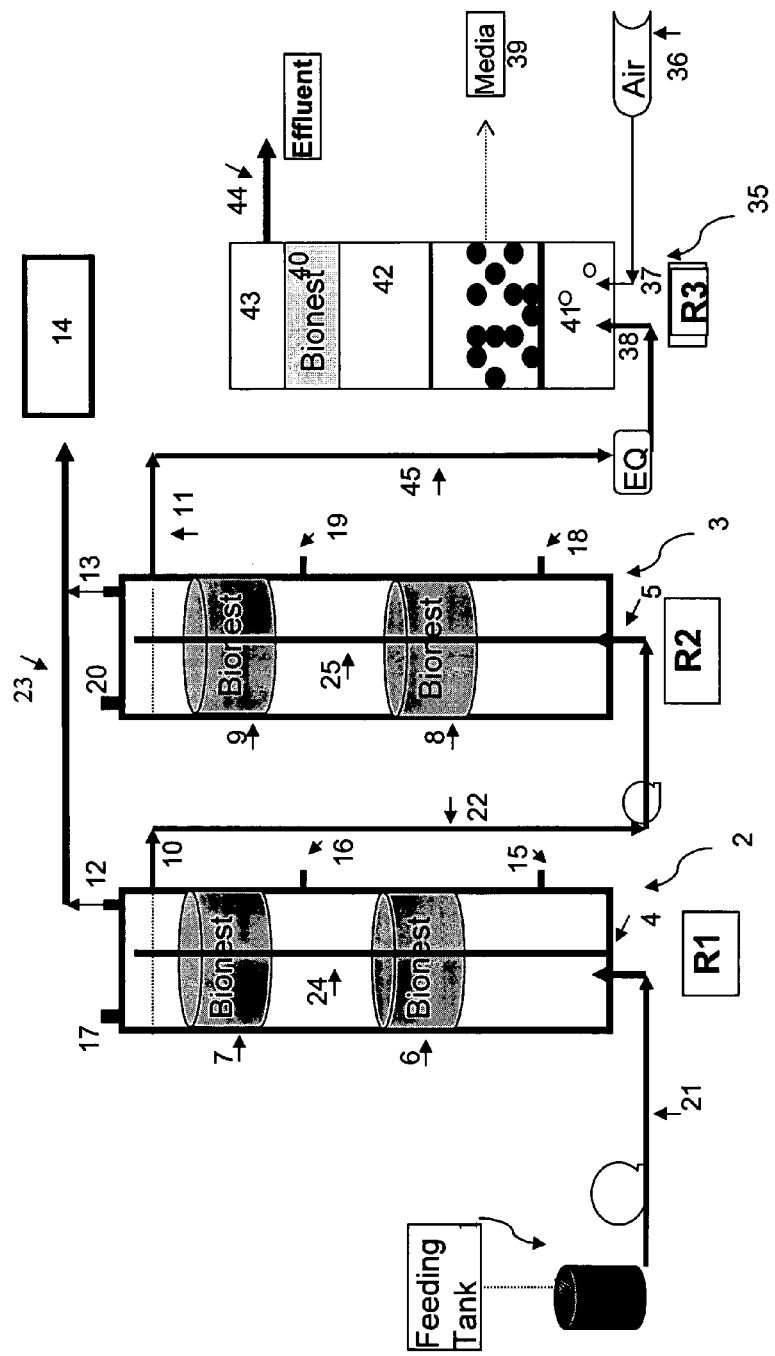
FIG. 4 is a diagram of a two-stage bionest reactor plus an aerobic reactor.
Figure 5:
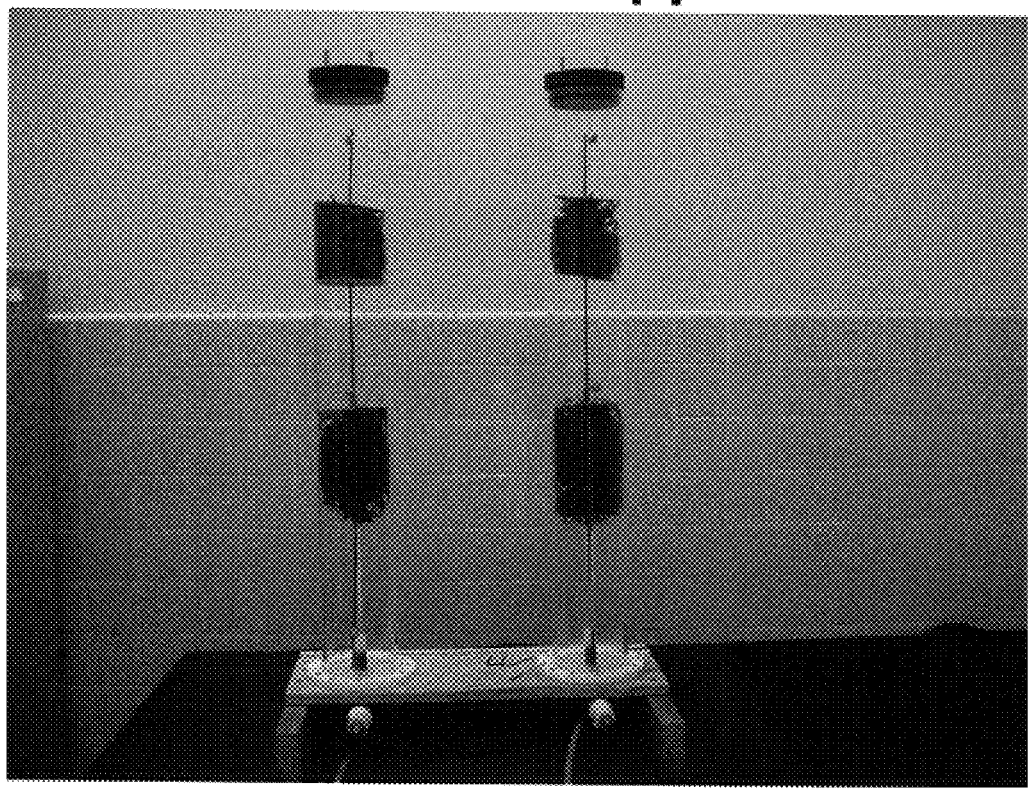
FIG. 5 is a photograph of a laboratory-scale two-stage bioreactor.

The bionest structure allows for a high surface to volume ratio. Wastewater flows through the nest rather than circumventing it, so a substantial amount of volume passes through the nest. This allows for a more efficient digestion of wastewater. FIG. 1 illustrates an example of one type of bionest structure, as detailed in Examples 2 and 3. Another example of a suitable bionest structure, made of stainless steel, is shown in FIG. 2. FIG. 3 is a diagram of a typical two bioreactor system. FIG. 4 shows a diagram of system that includes two anaerobic bioreactors plus an aerobic bioreactor connected in series. FIG. 5 is a photograph showing an actual small scale set up of the system.

The bionest can be made from any suitable material. Preferably, microbial organisms can bind to the surface of the material. The bionest material can be cut or formed into any suitable shape. For example, the material can be folded into multiple layers, or can be cut into multiple pieces and stacked to form the bionest layer. The material can be wound, coiled, or crumpled to form a loose structure that fits snuggly inside the bioreactor so that a substantial amount of the wastewater passes through (rather than flowing around) the bionest. The material can be formed so that it holds itself together, or can be formed from multiple pieces which are kept together by a supporting structure such as netting. The material may be formed into a porous material, such as a foam or a sponge. Examples of suitable shapes of the bionest material include but are not limited to ribbons, tubing, rods, hollow or solid spherical surfaces, sheets, netting, webbing, foam, sponge, and the like.

FIGS. 1 and 2 illustrate examples of the nest material formed into a bionest structure. Preferably, the bionest material is a substantially planar filamentous structure that provides a surface for attachment of biomass, while permitting flow of wastewater through the nest space. The term "nest space" refers to the region that surrounds and contains the bionest structure.

The choice of nest material to use in a given system can involve many factors, including for example, costs, bioreactor size, flow rates, maintenance, and waste materials to be digested. FIG. 1 and Examples 2–3 provide illustrations of the use of PVC waste material for a small scale demonstration bioreactor. Any suitable material can be used to form the nest material. Suitable materials for some embodiments that can be formed into a bionest unit include but are not limited to polyvinyl chloride, plastics, polycarbonate, polyvinylbutyrate, polyamide, ethylenevinylacetate copolymer polyurethane, polystyrene, polyvinylidine, polypropylene, polyacrylate, polycarbonate, composites, polysulfone, fiberglass, glass, polyvinylidine difluoride, natural materials such as wood chips, metallic materials, stainless steel, HDPE (high density polyethylene), reclaimed materials, waste materials, recyclable materials, and the like.

The nest material may be made from a mixture of materials. For example, it may be useful to prepare the bionest material from a composition that is suitable for folding into the desired shape, which is then covered with another type of material that allows optimal bacterial binding or retention in the bionest structure. Additionally, different bionest structures in a system may be made from different materials.

In some embodiments of the invention, the bioreactor housing is made of a material that allows for viewing of the contents, such as clear plastic or glass. However, other materials may be cheaper or stronger, or suitable for small or large scale use. Materials used for the bioreactor housing include but are not limited to glass materials, plastic materials, metal, wood, synthetic materials, concrete, composites, and natural materials. The container may be made of a mixture of materials.

In some embodiments of the invention, the bionest bioreactor can have a bank of two or more housings, where the wastewater flows serially along a flow path through each housing in the bank. In some embodiments, each housing has at least one nest space. Further, a plurality of banks of housings, arranged to permit parallel flow of wastewater through the system, can be used. This arrangement allows multiplex passage of a large volume of wastewater through the reactor so that substantially all of the wastewater passes through the reactor with a uniform hydraulic retention time.

A two-stage bioreactor is shown in FIG. 3. Wastewater is inserted into the system through the feeding tank 1. A first 2 and a second 3 anaerobic bioreactor are set up in series (although not required, the efficiency of the system, as well as increased methanogenic production, can be increased by using the second reactor 3).

Each reactor has an inlet 4, 5, at least one "bionest" section (6–9) having bacterial cells bound to a solid support system, an effluent outlet 10, 11, and a biogas outlet 12, 13. The biogas outlet can be connected by tubing 23 to a collector 14, such as a gas bag. The biogas may be collected for end uses such as, for example, energy use, or may be burned. The bioreactors can have additional ports, for example, for sampling throughout the reactor, for addition of nutrients or chemicals, or other uses (15–20). The wastewater moves from the feeding tank to an inlet 4 at the bottom of the first bioreactor 2 through tubing 21. The wastewater moves up through the bionest structure(s) (6, 7). The effluent leaves the reactor near the top of the system, and flows to the bottom of the second reactor 3 through tubing 22.

Upon entering the second bioreactor 3 at inlet 5, the wastewater moves up through the bionest structure(s) 8 and 9, and ultimately moves through the outlet 11 near the top of the second bioreactor 3. An optional support structure (24, 25) can be used to keep the bionest in place. Alternatively, any other supporting means can be used to keep the bionest in place, such as a support from the center or the periphery of the housing.

The system can also include a third bioreactor which is an aerobic bioreactor 35 (see FIG. 4). Air 36 is provided through an inlet 37 near the bottom of the reactor, and the effluent from the second anaerobic bioreactor is allowed to enter the reactor through an inlet 38. In some embodiments a media layer 39 can be present to support a population of aerobic microorganisms, and can be used in combination with a bionest structure 40. The effluent from the anaerobic bioreactor(s) is transported through a tubing means 45 and enters the aerobic reactor at an inlet 38 near the bottom of the reactor, and flows upward through a liquid region 41, the media layer 39, a liquid region 42, a bionest layer 40, a liquid region 43, and eventually out of the reactor at an outlet 44 near the top of the reactor. When an aerobic stage is coupled with the anaerobic stage, further cleaning and purification of the water can be accomplished. Likewise, the anaerobic bioreactor employing bionest material can be coupled with any other means of water treatment including systems employing filtration, chemical processing, and the like.

In some embodiments, a number of bionest structures (nest spaces) are present in each bioreactor system. The number of nest spaces in each reactor system can be from 1 to several. For example, the number of nest spaces can range from between about 1, 2 or 3 and about 16, 18 or 20. In some embodiments, the number of nest spaces in a system is from between about 4, 5, or 6, and about 8, 10, 12, or 14.

The choice of the number of nest spaces present in each individual reactor can also vary. For example, a particular unit may have from between about 0, 1, 2, or 3 and about 5, 6, or 7 or more nest spaces. The nest space can fill, for example, from between about 5%, 10%, 15%, 20%, 25% and about 70%, 80%, 90%, 95%, or 100% of the bioreactor. In some embodiments, the nest space may fill from between about 30%, 40%, or 50% and about 55%, 60%, or 65% of the bioreactor. The user can choose the amount of nest material best suited to particular needs, such as flow rate, the amount of bioreactors present in series, the amount of organic material in the wastewater, the size of the reactor, the desired efficiency of the system, and other factors.

The tightness of the nest space can also vary, depending upon the needs of the system. A looser structure can allow higher flow rates and turbulence, whereas a tighter structure may allow for higher total surface area and higher amounts of microorganism binding.

The design of the nest space allows for the manipulation of the amount and tightness of the nest material to alter process parameters such as efficiency, flow rates, etc. If desired, one can start the system, measure parameters, and readjust the amount or tightness of the bionest material as needed relatively easily.

The feeding tank 1 can hold the materials that are to go into the system. The tank can be of any material, and can be of any size desired. The feeding tank can be kept at a controlled temperature. For example, the feeding tank can be refrigerated to about 4° C., if desired, or it can be maintained at ambient temperature or incubated at an elevated temperature. The feeding tank can intermittently feed into the system, or can be added as a batch. The feeding tank can also feed into the system on a continuous basis. Alternatively, no feeding tank exists in the system, and the system is fed directly from the waste source through a connecting means (such as tubing, gulley, wash, or other flow systems).

The bionest bioreactor can be used to process many types of wastewater. The wastewater can have at least one pollutant. The wastewater may contain a mixture of pollutants. The pollutants can contain both organic and inorganic materials. The wastewater can be lipid-rich wastewater, such as dairy wastewater, or may be derived from other sources. Suitable wastewater materials include but are not limited to dairy sewage, milk parlor waste, raw sewage, untreated sewage, partially treated sewage, meat packing plant waste, urine or fecal waste from animals or humans, portable toilet waste, outhouse waste, slaughterhouse wastewater, agricultural waste, food production waste materials, biological waste, biological industrial waste materials, household waste, food production facility waste, fecal materials, drainage materials, infectious waste, medical waste, human blood and blood products waste, pathological wastes, and liquid wastes which may be derived from discarded biologicals, contaminated animal carcasses, body parts, and bedding, contaminated equipment and miscellaneous infectious wastes, household waste, commercial waste, and the like.

The reactor system can be designed to run on a continuous basis. Alternatively, the system can run on a batch basis, such as, for example, from 1 week to 6 weeks.

When starting a new run of a bionest system, sludge from existing anaerobic bioreactors or from other sources can be added to seed the system. Additionally, nutrients or chemicals may be added to the system as desired. Examples of nutrients that may be useful for addition to the system include but are not limited to nitrogen, phosphorus, pH adjustment molecules, macronutrients, micronutrients, microbial cultures, and the like.

Many types of microorganisms can be used. For example, a monoculture, methanogenic bacteria, acidogenic bacteria, a mixed population of organisms, microorganisms seeded in the bioreactor from another bioreactor, or the microorganisms present in the input wastewater material itself can be used. The microorganisms can be a mixture of organisms present in combination with organic material. In some embodiments, the various beneficial microorganisms and their organic milieu can be referred to collectively as "biomass." Preferably, at least some of the biomass is attached to the surface of the nest material.

The biomass contained in the reactor can be of various concentrations. For example, the biomass can exist in association with the nest material at a range of from between about 0.1 g/l or less, 1 g/l, 10 g/l, and about 100, 150, 250, or 300 g/l, or more. Preferably, the biomass exists in association with the nest material at a concentration of at least about 10 g/l.

The anaerobic biological processing of wastewater can proceed by two main steps: an acidogenic step and a methanogenic step. These two steps can be separated in space and/or time, or can occur together. For example, in some embodiments of the invention, the reactor system contains a first nest in which acidogenic bacteria are predominantly active, and a second nest in which methanogenic bacteria are predominantly active. Alternatively, the first reactor can be predominantly the site of acidogenesis, while the second reactor be predominantly the site of methanogenesis. In some embodiments, the methanogenic and acidogenic bacteria can be located together in the same nest space, while the primary biological activity will largely be driven by the presence of suitable substrate.

The system can operate at various flow rates, depending on various factors, including, for example, the quality of the wastewater input, the efficiency of the system, the size of the system, the temperature of the system, the age of the batch, and the efficiency of the microorganisms present.

The bionest bioreactor system can be designed to have a wide range of void volumes. For example, the void volume can be at least about 50% or less, 60%, 70%, or 80%. Preferably, the system has a void volume of at least about 85%, 90%, 95%, 98%, or 99% or greater.

The system can operate at a wide range of pH levels. For example, the system can operate with a pH of from about 2.0 or less, 2.5, or 3.0 to about 9.0, or higher. More preferably, the system operates with a pH of from about 3.5, 4.0, 4.5, 5.0, 5.5, or 6.0 to about 6.5, 7.0, 7.5, 8.0, or 8.5. Different micro-areas within the system may have different pH levels. If desired, additives that buffer the pH, or adjust the pH up or down can be added to the system.

The bionest bioreactor system can be designed for any size as needed. For example, the system can be designed for a micro-scale, small scale, laboratory scale, pilot scale, or industrial scale. The system can be designed so as to be short term, or can be a permanent system. The system can also be designed to suit individual households, or entire communities in addition to use for industrial scale operations.

The bionest system can, if desired, be assembled at a very low cost. For example, the bionest material can utilize recycled materials which are formed into the nest structure. The bioreactor containers can be made from low cost materials. Once a procedure is set up, the system can be operated without the need for additional expenses such as costs of laboratory analysis. Heating does not need to be used, adding to the cost efficiency of the system. Lastly, the system creates methane-rich biogas which can be used as a cost-efficient energy source for heating, cooking, or other uses.

The bionest bioreactor system can produce a biogas that is rich in methane. The biogas is preferably from about 50% or less, to about 80% methane or more. The collected gas is preferably from a range from between about 60%, or 65% and about 70%, or 75% methane. The remaining gas is typically $CO_2$. The methane can be burned, or can be used for a biofuel. The methane production of the bionest system is preferably greater than 1 l/l/d at 22° C. and a loading rate of 10 g/l/d. Preferably, the methane produced is at a rate of greater than 1.5, 2, 3, 4, 6, 8, or 10 l/l/d or greater at 22° C. and a loading rate of 10 g/l/d.

The methane production can occur when the system is operating at a range of temperatures. For example, the methane production can occur when the system is operated from less than about 5° C., 10° C., or 15° C. to about 35° C., 40° C., 45° C. or greater. In some preferred embodiments, the methane production occurs when the system is operated at a temperature of below 25° C. This relatively low temperature at which methane production can occur permits the bionest reactor to be extremely cost- and energy-efficient. With no need for an external source of heat to drive the production of methane, the ratio of energy harvested from the system, compared to external energy consumed by the system, is very high.

This property can be expressed based on an energy output to input ratio. In some embodiments of the invention, the energy output to input ratio of methane production methane can be in a range of from between about 1:1, 1.5:1, or 2:1 and about 9:1 or 11:1 or 13:1 or 15:1. Preferably, the energy output to input ratio of methane production is from between about 3:1 or 4:1 and about 5:1, 6:1, or 7:1.

One reason for the productivity of the bionest system is that the bionest material has a high surface to volume ratio. This surface to volume ratio of the nest material is preferably greater than 10,000:1. The surface to volume ratio is more preferably between about 30,000: 1, 40,000:1, or 50,000:1, and about 65,000:1, 75,000:1, 85,000:1, and 100,000:1.

The thickness of the nest material can also be varied. The thickness can be, for example, less than about 1 cm, or less than 0.5 cm, 1 mm, 100 µm, 50 µm, 25 µm, or 10 µm. The thickness can also be greater than 1 cm. The choice of thickness of the nest material can also depend on the size of the reactor system—industrial systems may, for example, use nest material that is thicker than would be used for laboratory scale systems.

Analysis of the System Efficiency

To examine aspects of the bionest reactor system, several parameters were determined. Throughout the specification, several wastewater treatment terms are used. The term "TCOD" (Total Chemical Oxygen Demand) is a measure of the total organic pollutant present. The term "COD removal" describes the Chemical Oxygen Demand removed from the system. The term "SCOD" (soluble chemical oxygen demand) is a measure of the amount of the soluble fraction of the TCOD.

The COD removal efficiency can vary depending on the wastewater type, concentration, flow rates, and other factors. For example, in some embodiments of the invention, the COD removal can be between about 10% or less, 20%, or 30% to about 55%, 60%, 70%, 80%, or greater at a loading rate of over about 10 g/l/d. In some embodiments, the bionest bioreactor can have a COD removal efficiency of at least about 50% at a loading rate of over about 10 g/l/d.

The bionest bioreactor system of the invention is particularly useful for processing wastewater that is rich in lipids. In some embodiments of the invention, the lipid content comprises at least 25% of TCOD of the wastewater to be treated. The lipids present in the wastewater to be processed can be present in a wide range, for example, of between about 0, 5, 25, or 50 mg/l and about 1500, 1700, or 1900 mg/l. The bionest system is capable of processing much higher amounts of lipid than conventional systems. Accordingly, in preferred embodiments, the amount of lipid that can be efficiently treated in a bionest reactor can be, for example, between about 300, 400, 500, or 700 and about 1,000, 1200, or 1300 mg/l or more.

The term "HRT" (Hydraulic Retention Time) is the amount of time liquids stay in the reactor. The bionest reactor system can be operated at varied HRTs. For example, the system can be operated at an HRT of from less than about 0.5 hours to more than about 100 hours. Preferably, the nest material can retain a substantially constant biomass at a range of HRT between about 1, 5, or 8 hours and about 35, 40, 50, 60, or 80 hours. More preferably, the nest material can retain a substantially constant biomass at a range of between about 10, 15, and 20 hours to about 24, 26, 28, or 30 hours. In some embodiments, the HRT is less than about 15 hours.

The term "SRT" (Solids Retention Time) is the amount of time solids stay in the reactor for processing and breakdown. One useful measurement of the efficiency of the bioreactor system is the ratio of SRT to HRT. The bionest bioreactor system can have a SRT:HRT ratio of greater than 20, 30, 40, or greater. The system preferably operates at a SRT to HRT ratio of between about 40:1, 60:1, or 80:1, and about 200:1, 225:1, or 250:1. More preferably, the SRT:HRT ratio is from between about 100:1, 110:1, 120:1, and about 140:1, 160:1, or 180:1.

The term "TSS" (Total Suspended Solids) is the total amount of suspended solids in the system. The term "VSS" (total volatile suspended solids) is a measure of suspended solids in the system which are volatile. The term "OLR" (Organic Loading Rate) is a measure of the amount of organic material loaded into the system.

Figure 6:
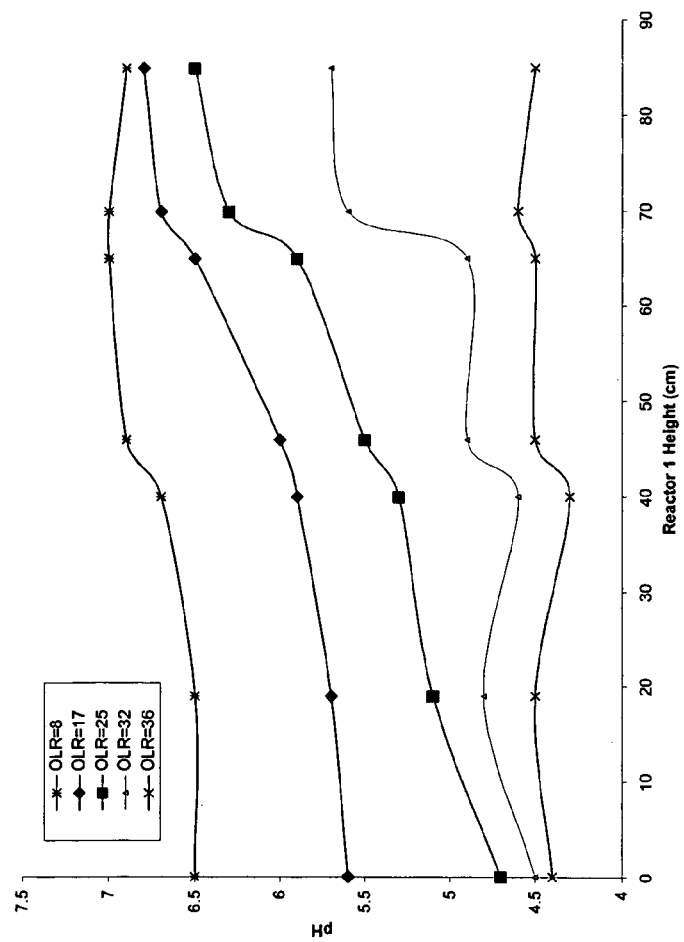
FIG. 6 is a line graph showing the pH at various heights in Reactor 1, with various loading rates (OLR).
Figure 7:
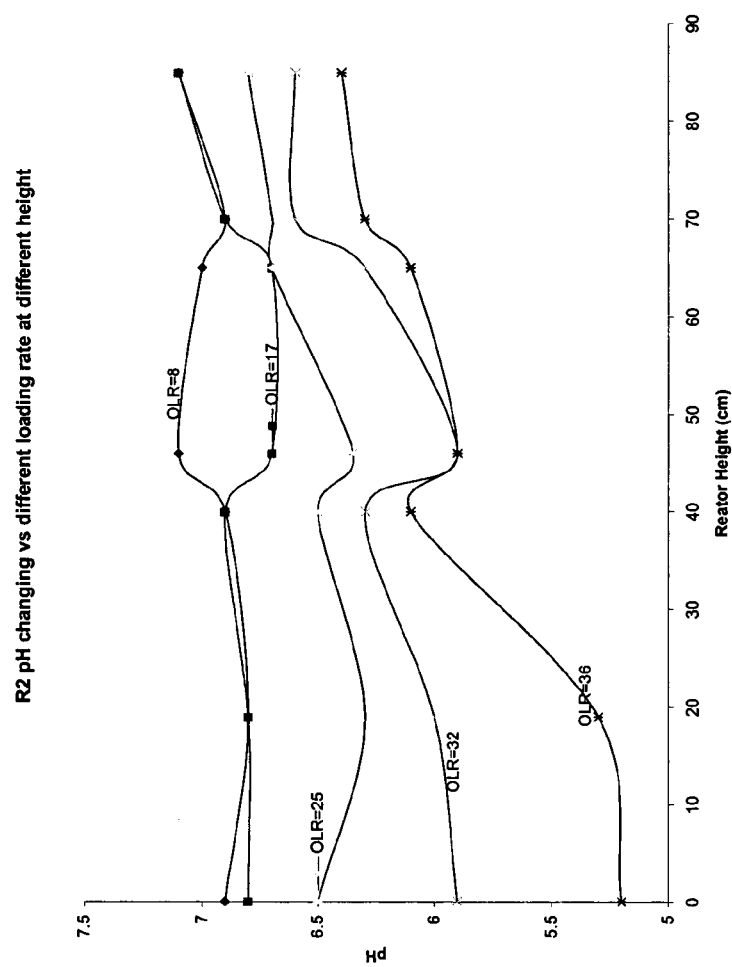
FIG. 7 is a line graph showing the pH at various heights in Reactor 1, with various loading rates (OLR).

The bionest bioreactor system described in Examples 2 and 3, which was operated at temperature range of 22±2° C. for 6 months, was used to study various system parameters. One of the examined parameters is pH. The organic loading rates can affect the pH of various regions of the system. To determine how the pH varies in different areas of the bionest bioreactor system of Example 2, pH measurements at different heights of the $R_1$ and $R_2$ reactors was taken under various organic loading rates (FIGS. 6 and 7, respectively). The pH was found to vary somewhat in different regions of the reactor, being generally higher at higher reactor height. This pH difference was especially noticeable when the overall loading rate (OLR) was above 15. The OLR itself appeared to affect the pH of the system considerably. As the OLR increased, the pH of the system tended to decrease. For example, the pH at the middle of the R1 reactor, loaded at an OLR of 8 was about 6.7, while the pH at the middle of R1 was about 4.4 with a higher OLR of 36 (FIG. 6).

Figure 8:
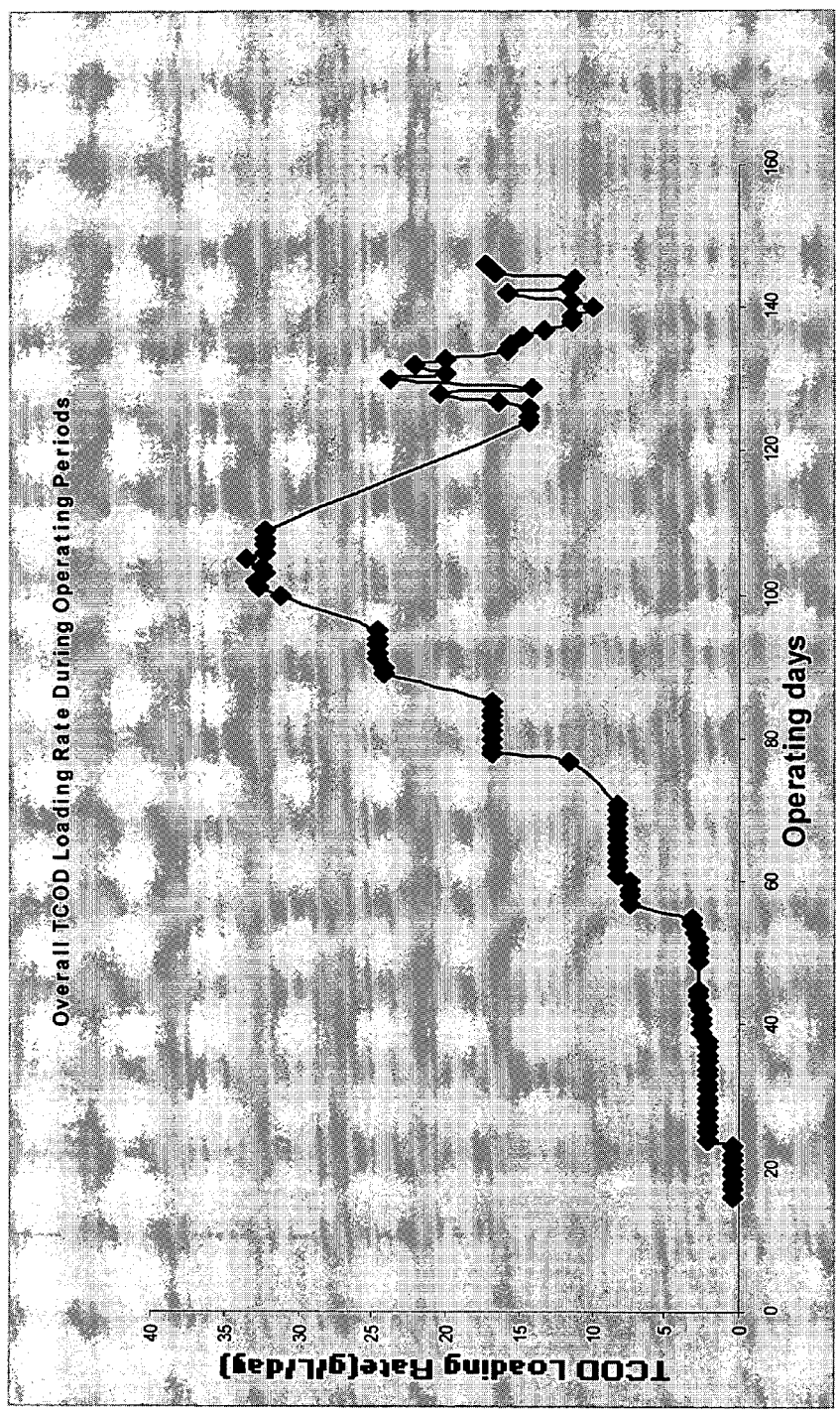
FIG. 8 is a line graph showing the gradual system start-up by a gradual step-up in influent TCOD loading rate.
Figure 9:
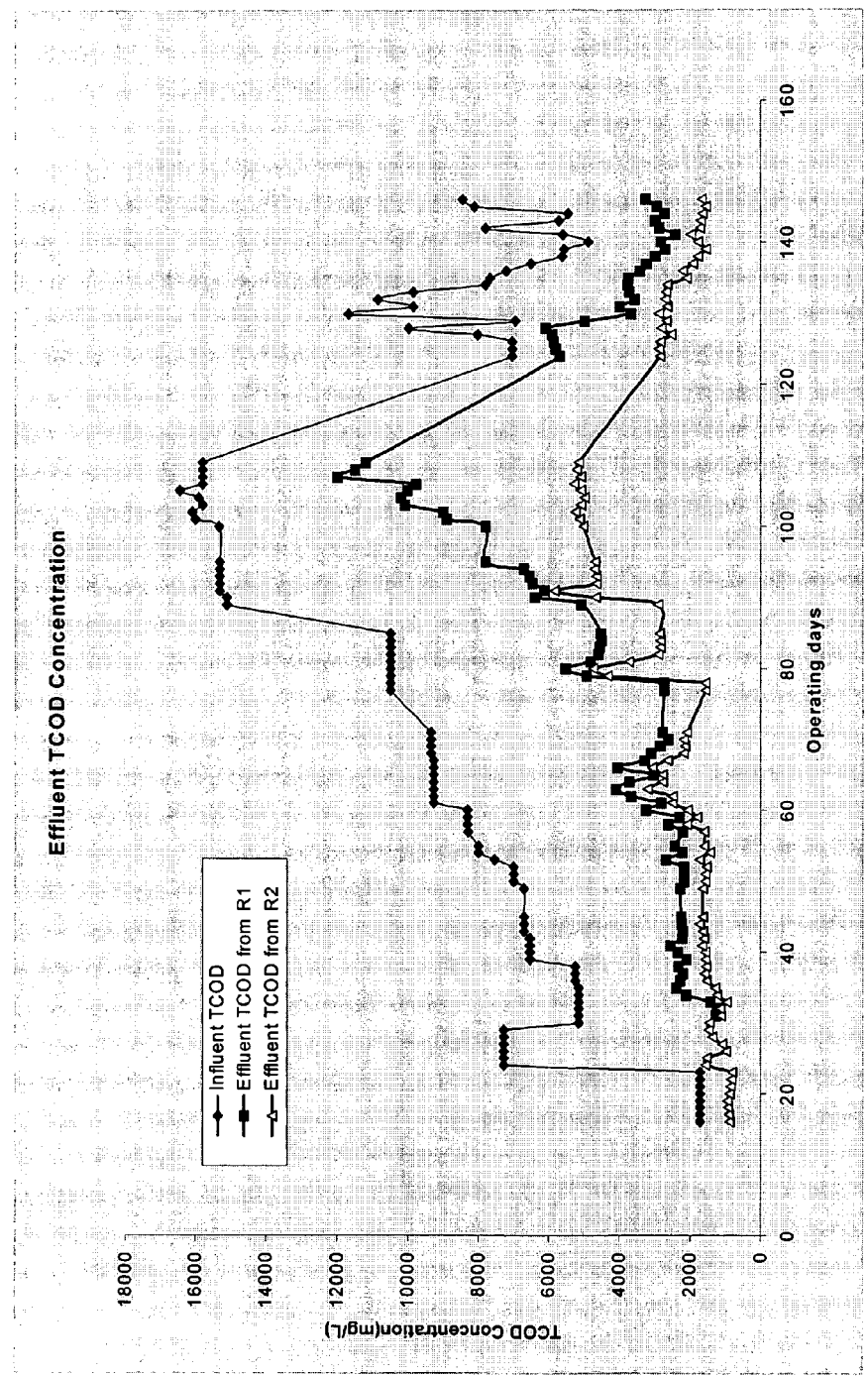
FIG. 9 is a line graph showing the influent TCOD compared with the effluent TCOD from the R1 and R2 reactors.

The bionest bioreactor system described in Example 2 was also analyzed to determine effluent TCOD rates and effluent SCOD rates. As described in Example 2, the operation of the system was increased in a gradual, step-wise fashion, from TCOD loading rates of 2.68 g/l/d to 36 g/l/d by using different TCOD concentrations of wastewater and by controlling the flow rate (FIG. 8). FIG. 9 shows the influent TCOD vs. the effluent TCOD from both R1 and R2 reactors.

The bionest bioreactor system is capable of a fast start-up time, as compared to many conventional systems. The bionest system typically involves, for example, a quick step up to function within about 2 weeks or less.

Figure 10:
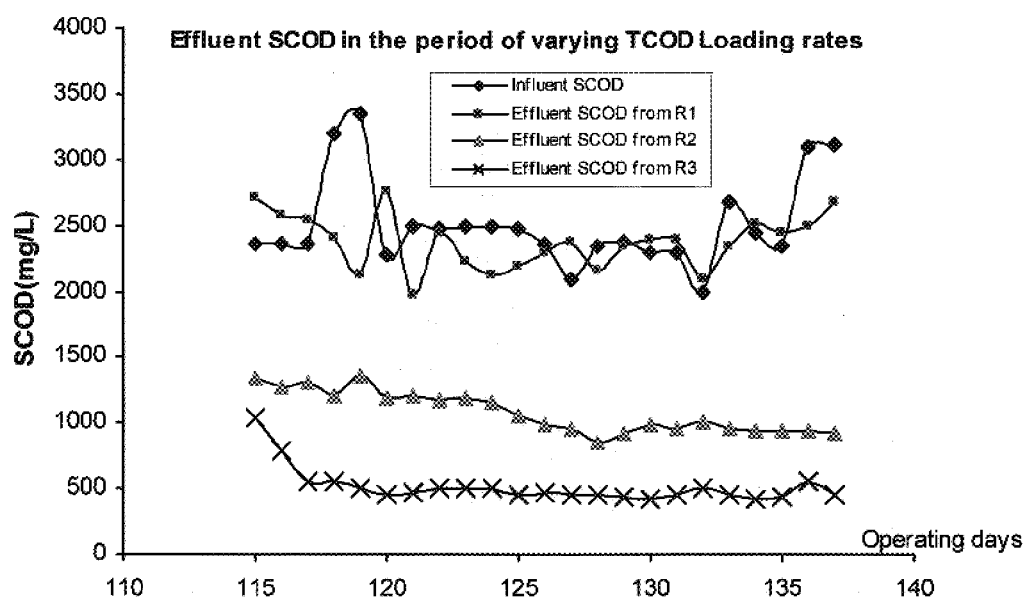
FIG. 10 is a line graph showing the system stability, as measured by SCOD levels of the effluent during operation of the bioreactor.

The system stability of the system at "period 8" (wherein the TCOD loading rate was from 9–25 g/l/d) was measured by measuring influent and effluent SCOD (FIG. 10). It was found that while the input SCOD varied substantially from day to day, the SCOD from R1 was relatively stable. The SCOD from R2 was lower than from R1, and was also stable over the operating period of the reactor.

The system stability was also tested by measuring influent and effluent levels of TCOD at operating period 8 (where influent TCOD =9–25 g/l/d). The results (FIG. 11) show that while the influent TCOD can vary substantially from day to day, the effluent TCOD from R1, R2, and additionally R3 (aerobic bioreactor) was relatively stable over the operation period.

Preferably, the design of two stages of "bionest" anaerobic reactor is used for increased efficiency. This two-stage system can accommodate a higher organic loading rate. The two-stage system can also provide a "buffer" zone for achieving the formation of methane gas in the R2 under a TCOD loading rate of 25 g/l/d. Higher TCOD loading rates of 32 and 36 g/l/d were not high enough to achieve adequate methane gas production, although the two-stage bioreactor was installed. Apparently, additional stages of bioreactor (or a bioreactor with a higher SRT) may be required when using higher TCOD loading rates.

As mentioned previously, wastewater with a high lipid content presents special hurdles for wastewater treatment methods. Previous research has suggested that high lipid materials, such as milk fat, require higher than ambient temperatures for efficient digestion. For example, Van Lier et al., (1996; incorporated by reference herein in its entirety) suggested a temperature of 65° C. with an SRT of >5 for optimum conversion. At 24° C., it has been suggested that at least 8 to 15 days SRT is needed (Miron et al., 2000). In contrast, at 15° C., Zeeman and Lettinga (1999, which is incorporated by reference herein in its entirety) suggested that at least a 75 day SRT is needed for digestion.

Figure 12:
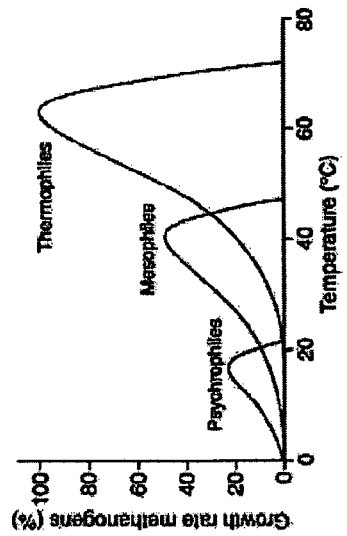
FIG. 12 is a line graph showing the general effect of temperature on growth rate in three types of microorganisms: psychrophiles, mesophiles, and thermophiles.

Many conventional lipid-rich wastewater treatment systems utilize elevated temperatures to treat such high lipid wastewater. Higher temperatures often require the use of different types of microorganisms to proceed efficiently. FIG. 12 shows a graph of the growth rates of psychrophiles, mesophiles, and thermophiles at various temperatures.

Although the increased temperature of conventional systems adds to the ability to digest high lipid materials, the energy required to heat the systems may be very costly. In contrast, although the bionest system of the invention can be operated at elevated temperatures if desired, the system can work well at a range of temperatures, including ambient temperature. For example, the bionest system can be designed to operate at a temperature of about 5° C., 10° C., or 15° C. to about 35° C., 40° C., 50° C., or 70° C. Preferably, the bionest system operates at a temperature of about 20° C., 22° C., 24° C., 25° C., to about 26° C., 28° C., or 30° C. More preferably, the bionest system operates at ambient temperature conditions. Because the bionest system is still capable of efficiently treating lipid-rich wastewater even at ambient conditions and relatively high organic loading rates, the bionest methods of the invention are particularly suitable for lipid-rich wastewater treatment such as dairy waste.

Solids Retention Time (SRT)

The design of the bionest system allows for increased retention time of solids, as compared to conventional systems. For example, in some embodiments, the system can operate with a long SRT (for mesophilic systems: greater than 8 days; for psychrophilic systems: greater than 75 days). A bionest system run with an HRT of 10 hours provided a minimum of 89 days of SRT. This capability to provide a long SRT, in combination with the good mixing conditions of the system, helps to facilitate the efficiency of the bionest system. The method of measuring SRT is shown below.

The SRT (R1+R2) value was estimated using the mass balance of nitrogen input and output, using the following equation:

$$SRT=(TN_{influent}-TN_{effluent}-TN_{soluble})/(TN_{effluent}-TN_{soluble})/\text{day}$$

Where $TN_{influent}$ is the concentration of total nitrogen of influent, N-mg/l;

$TN_{effluent}$ is the concentration of total nitrogen in the effluent, mg/l;

$TN_{soluble}$ is the soluble nitrogen in the reactor, mg/l;

$(TN_{effluent}-TN_{soluble})$ is the daily discharged nitrogen in the biomass, mg/l/day.

TABLE 1

The Relationship among SRT, HRT and OLR

| Period | HRT(hours) | OLR(g/l/d) | SRT(days) |
|---|---|---|---|
| 1 | 60 | 2.68 | 114 |
| 2 | 50 | 3.2 | 110 |
| 3 | 25 | 8.3 | 106 |
| 4 | 15 | 17 | 103.2 |
| 5 | 15 | 25 | 104 |
| 6 | 11.5 | 32 | 98 |
| 7 | 10 | 36 | 89 |

Figure 13:
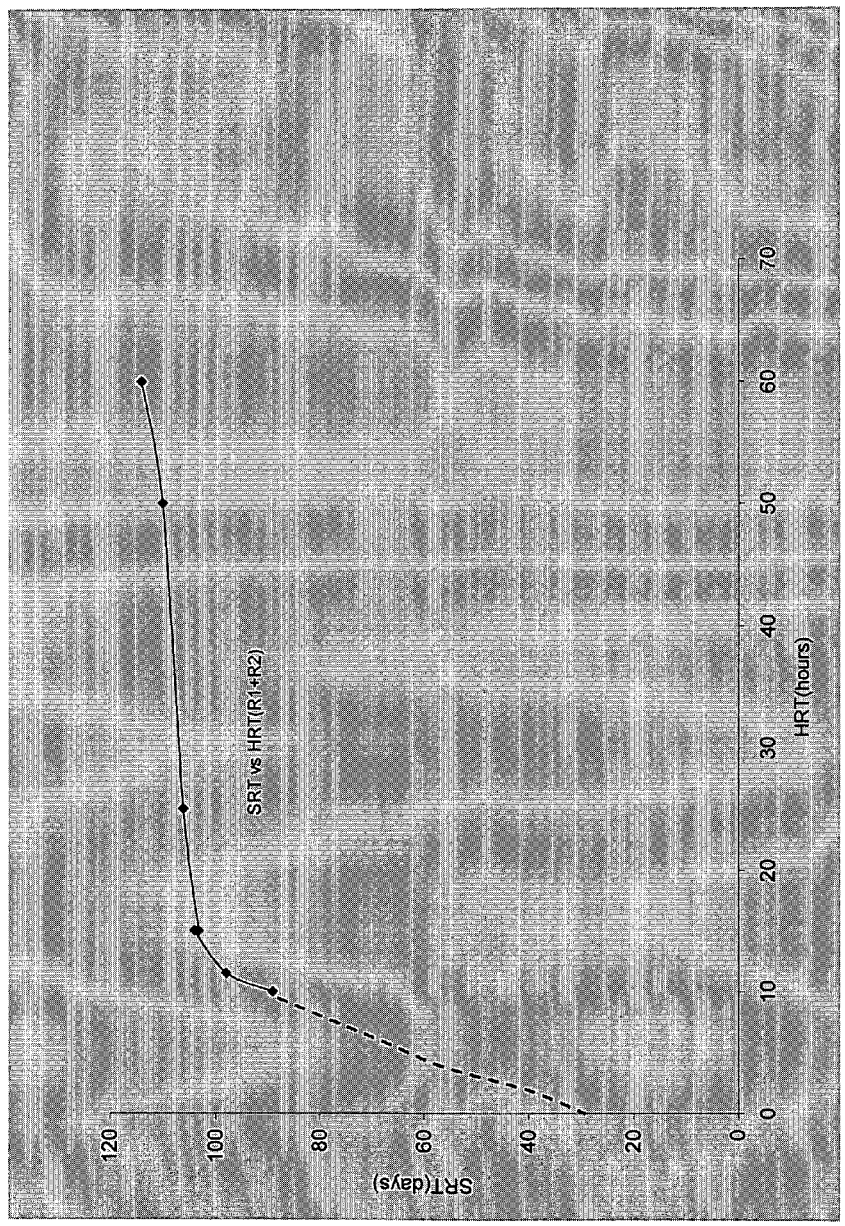
FIG. 13 is a line graph showing the relationship of SRT (measured in days) to HRT of R1+R2 (measured in hours).

Using the above measurement to determine SRT, the relationship between SRT and HRT was examined in the bionest system. As shown in the FIG. 13, when the system is operated at HRT>15 hours, SRT levels are relatively independent from the HRT. When the system is operated at an HRT of less than 15 hours, the SRT level is considerably affected by the HRT. The dashed line indicates that sludge would never wash out. For the small scale design this design and this high milk lipid content wastewater, more than 15 hours of HRT is needed to achieve the stable COD removal and methane gas production.

For high fat and lipids content wastewater, Miron (2000; the disclosure of which is incorporated by reference herein in its entirety) reported, at 25° C. ambient operation condition, SRT≦8 days resulted in acidogenic conditions with negligible biogas production, whereas an SRT>8 days resulted in methanogenic conditions. The lipids and carbohydrate hydrolyis process increased with increasing SRT, whereas the protein hydrolysis only occurred under methanogenic conditions. Apparently, at mesophilic condition, the way to get high lipids conversion is to increase the SRT and/or increase stages of bioreactors.

Comparison of Sludge Distribution: The Bionest Reactor vs. Other Types of Reactors Example 7 shows an analysis of the sludge of a bionest bioreactor. It can be seen that the bionest installation provides a great advantages for biomass growth and even distribution, good sludge quality and easy maintenance. The sludge quality is comparable with the USAB granules which usually have 45–57 g/l (Batstone and Keller, 2001).

As mentioned earlier, conventional UASB systems often develop a "dead zone." The bionest reactor has a much lower dead zone, however. The bionest reactor only has a 7% dead zone compared with UASB has 38–42% of dead zone (Lens et al., 1998). The lower dead zone of the bionest system helps to make the bionest reactor system more efficient than conventional systems. Further, some systems can develop short cuts or "cut throughs" in the system, where waste water flows through a short cut, without being treated. The design of the bionest system minimizes this problem.

Figure 15:
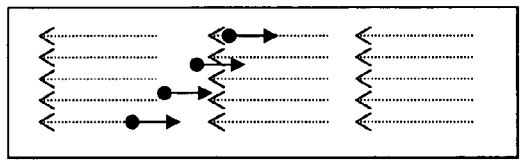
FIG. 15 is a diagram demonstrating various Cases of Mixing Related to Sludge Gravity Settling and Upflow Velocity.
Figure 15:
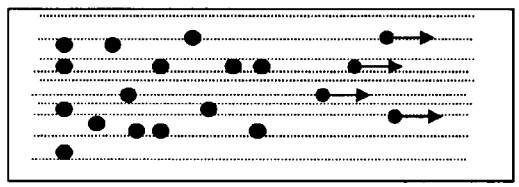
Figure 16:
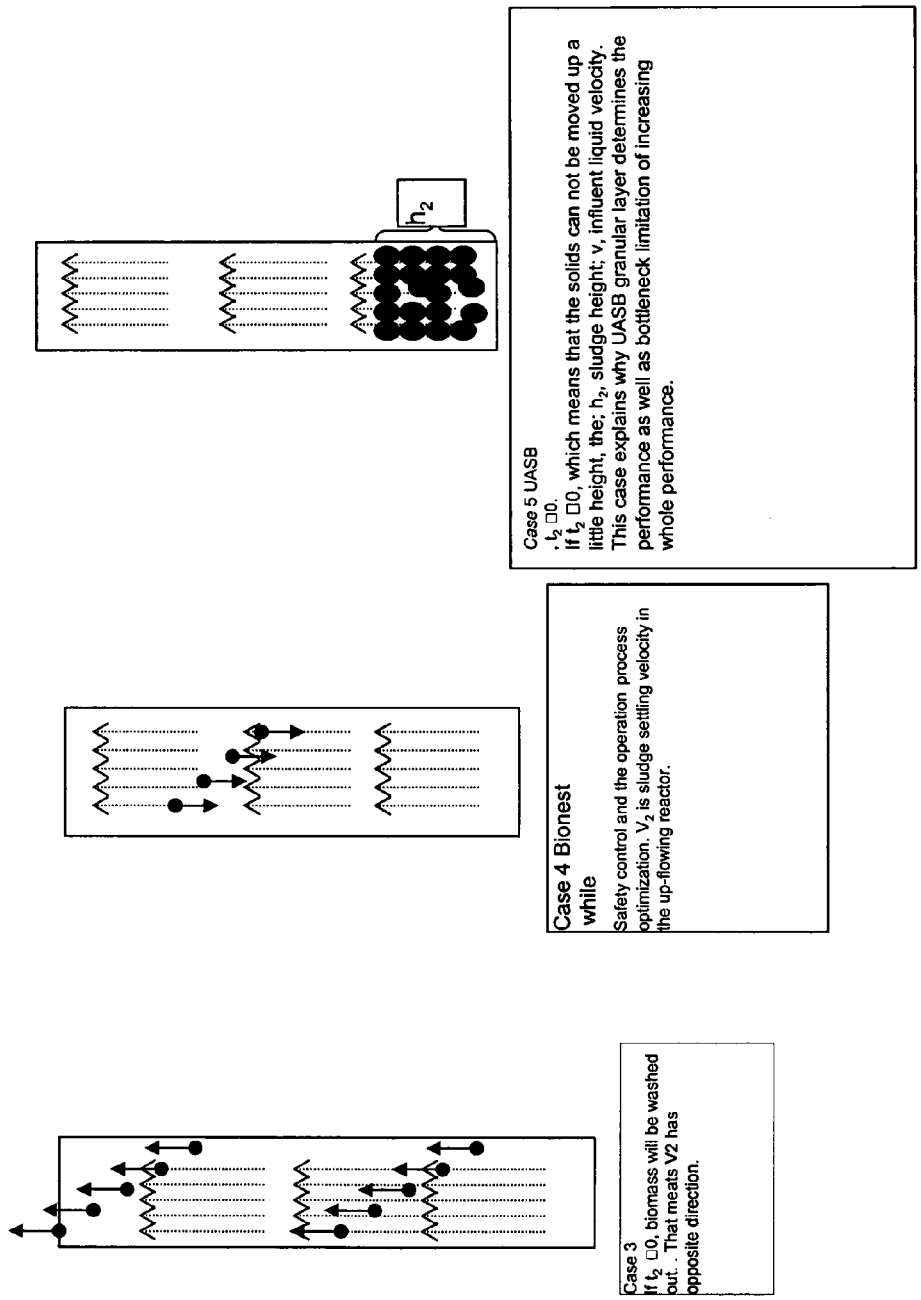
FIG. 16 is a diagram demonstrating Various Cases of Mixing Related to Sludge Gravity Settling and Upflow Velocity.

The bionest system has an overall increase in biomass as compared to conventional systems such as the UASB system. The structure of the bionest system helps form a turbulence flow and additionally provides internal circulation of materials. The increase in internal circulation provides an optimal sub-environment for the digestion process to occur. For example, the bionest reactor of Example 2 resulted in a relatively constant concentration of biomass at about 26 to 30 g/l. This high level allows for more mixing space, and a more effective interaction between the microorganisms and the material to be digested. Examples of mixing conditions with various types of reactor systems are shown in FIGS. 15 and 16.

Further, the homogenous distribution of the sludge in the reactor contributes more space for mixing and reaction. The increased reaction space and more effective reaction time of the bionest system also allows it to function at a higher TCOD rate than is typically used in other systems. Further, the COD removal rate is also higher than in conventional systems. A comparison of the sludge from the bionest reactor versus a UASB reactor is shown in FIG. 8. Compared with the batch reactor without a bionest, the total sludge inside the bionest reactor is 5.7 times greater than in a batch reactor without the bionest installation.

While conventional UASB reactors typically contain granules of material, the biomass in the bionest bioreactor system is typically present as flocs. Because the flocs have poorer settling properties than the granules, appropriate operation is very important to maintain a high concentration of biomass and even distribution of sludge. Therefore, in addition to the HRT, SRT, biomass concentration (or aggregation), from the view of operation, other operation criteria may need to be also considered. These criteria are listed as follows:

Effective Mixing Time (EMT): Biomass effectively mixed with substrate including soluble and suspended forms based on the hydraulic retention time.

Effective Biomass Reaction Process (EBRP): the reaction process and reactor performance highly and directly depend on the effective biological reaction process rather than SRT itself.

Figure 11:
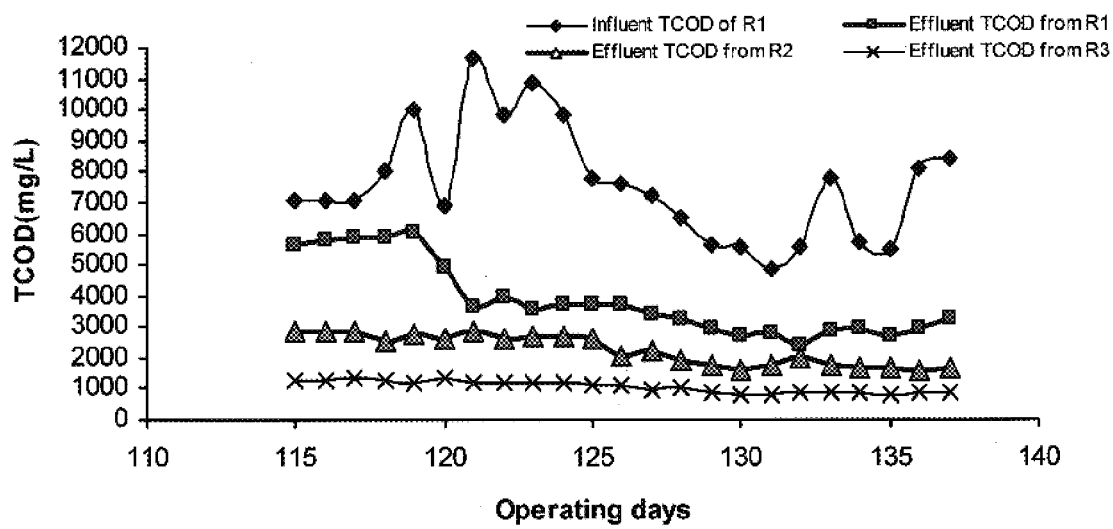
FIG. 11 is a line graph showing the system stability, as measured by TCOD levels of the effluent during operation of the bioreactor.

Mixing conditions define, in some embodiments, a more beneficial control criterion than SRT. Vieira and Garcia (1992; the disclosure of which is incorporated by reference herein in its entirety) indicated that biomass gravity settling velocity and upflow velocity were significant factors in assessing effectiveness of the mixing conditions. FIGS. 9–11 illustrate different cases of mixing conditions related to sludge gravity settling and upflow velocity.

The effective mixing time prevails so that no matter what kind of growth rate and sludge type, the reaction is determined by EMT rather than HRT or SRT. The high rate reactor preferably provides sufficient EMT and biomass substrate efficiency mixing.

In the bioreactor system of Examples 1 and 3, the sludge gravity was about 1.7–2.2 m/hour in steady water, in upflow velocity of 0.6 m/hour and gravity settling velocity decreased to 0.9–1.1 m/hour because of the gas content (Example 7). Accordingly, the intermittent feeding operation with 1 hour on and 1 hour off was suitable for preventing biomass from washing out.

Thus, the sludge distribution comparison between pre-feeding and post-feeding was compared for R1 by the feeding operation of 1 hour on/off. As shown in FIG. 11, the sludge distribution based on total biomass estimation is not much different between pre-feeding and post-feeding. Accordingly, intermittent feeding operations can periodically attenuate sludge displacement up and down. FIG. 11 shows that the total sludge mass was only 2–3.2% different between the start feeding point and the end of the feeding. The two-hour feeding resulted in a 5% difference between the post-feeding and pre-feeding for sludge wash-out.

Accordingly, sludge movement in the bionest unit during the feeding period demonstrates that flow shortcuts did not occur with intermittent operation. The formation of shortcuts and channeling using upflow anaerobic filter was reported by Cordoba et al. (1995) and Nadais et al. (2001).

Comparison of Performance of Various Reactor Types

A performance comparison of different types of reactor for the anaerobic treatment of ice cream wastewater (Hawkes et al., 1995) is shown below in Table 2. In that study, it was concluded that an anaerobic filter performed the best for the treatment of ice cream wastewater. Because the anaerobic bionest reactor of the present invention was designed to combine the advantages of both anaerobic filters and UASB for the treatment of dairy wastewater, the performance was compared (Table 3). The results show that the bionest reactor performs the best in regards to the high organic loading rate, lower temperature (20 °C.), reasonable COD removal rate and methane yield.

TABLE 2

Comparison of Various Types of Anaerobic Reactors (Hawkes et. al., 1995).

| Reactor type | Loading rate (kgCOD/m3/d) | HRT(days) | TCOD removal efficiency % | Methane content % | Crucial problems |
|---|---|---|---|---|---|
| Anaerobic filter | 6.38 | 0.93 | 66.9 | 75.3 | |
| Contact process | 1.05 | 5.51 | 81.8 | 76.9 | Poor performance of settling |
| Fluidized Bed | 4.2 | 1.47 | 55.7 | 70.1 | Difficulty of GAC break up |
| UASB | 2.19 | 1.62 | 49.0 | 69.6 | Granule never form |

Note:
Reactors were operated at 35° C. and using dairy ice cream wastewater as substrate.

TABLE 3

Comparison of Performance of Various Reactor Types under Different Operation Conditions

| Reactor Types | Wastewater (COD g/l) | Temperature (° C.) | Organic loading rate (COD g/l/d) | HRT (days) | TCOD Removal efficiency (%) | Source | Problem |
|---|---|---|---|---|---|---|---|
| UASB hybrid | Dairy farm 8.4 | 30 | 8 | 1 | 90.1 | a | |
| UASB | 0.4–20 | 35 | 2.19 | 1.62 | 49 | b | Granulation failed |
| UASB | Dairy 5.0–7.0 | 35 | 3.5–5 | 2 | 90 | c | Granule support |
| UASB | Dairy 50–60 | 30 | 3.84 | | 83 | d | Digester |
| Anaerobic Filter | Dairy 4.9 | 35 | 6.38 | 0.93 | 66.9 | b | |
| Bionest reactor | Dairy 5.0–13.5 | 20 ± 2 | 15 | 0.63 | 70–75 | Present study | | a, Cordoba et al, (1995);
b Hawkes Freda (1995) R., Donnelly T. and Anderson G. K. (1995);
c Ince (1998);
d. Vartak et al., (1997).

The unique design of the bionest anaerobic reactor provides an effective tool for the biological treatment of waste water. The advantages of operating the bionest anaerobic reactor include, for example, the high SRT and high biomass content, a good application of EMT and EBRP, less dead zone effect, and the presence of a stable operational condition for COD removal and methane gas production. The bionest system also results in better mixing than conventional systems. The bionest reactor system also addresses the disadvantages of UASB and anaerobic filter processes, for example, by providing the absorption of shock loading and stable operational conditions. Lastly, the bionest system substantially reduces or prevents the washout of sludge which commonly occurs in some conventional systems.

The above disclosure generally describes the present invention. A more complete understanding can be obtained by reference to the following specific examples which are provided herein for purposes of illustration only and are not intended to limit the scope of the invention.

EXAMPLES

Example 1

Analysis of an Existing, Non-bionest Wastewater Treatment: Dairy Wastewater from a Hawaiian Cattle Farm The system parameters of an existing, nonbionest wastewater treatment facility operated in Oahu, Hawaii were measured for comparative purposes. The source of the wastewater was a 1600 head livestock farm, including 1,000 milk cows and a milk-producing facility.

Wastewater flow: 300,000 gallon/day (1,136 m³/day).
Total COD Concentration: 4000–6500 mg/L.
Soluble COD: 1200–2000 mg/L.

The discharged wastewater flowed into two receiving lagoons, each with the following dimensions: 50×250×6 ft³ (15.24×76.2×1.83 m³). The effluent was discharged to 10 acres of land planted with California Grass.

The source and characteristics of the dairy wastewater generated from the diary farm are indicated below in Table 4. The various types of wastewater present in the dairy farm were analyzed to determine TCOD, SCOD, N, P, TSS, and VSS. Total COD, soluble COD, total suspended solids, volatile suspended solids (mg/l).

units. They were filled with two layers of medium resulting in 98% void volume in the reactor. The reactor was made of transparent PVC in order to be able to observe the sludge formation and accumulations. Three sample outlets were designed to test the sludge distribution at the different heights of 15 cm, 65 cm and 90 cm, respectively. A special puncture needle was designed to take samples from the bionest. Table 5 shows the main parameters of the two-stage bionest reactors and bionest content. FIG. 1 shows an example of the bionest structure, FIG. 3 shows a diagram of the two-stage anaerobic bioreactor, and FIG. 4 shows a diagram of the two-stage anaerobic reactor plus an aerobic bioreactor. FIG. 5 is a photograph of the reactor of FIG. 3.

TABLE 5

Basic Parameters of one example of a Bionest Reactor

| | Reactor 1 ($R_1$) | Reactor 2 ($R_2$) | Bionest layer |
|---|---|---|---|
| Material | Filled with 2 layers bionest PVC | Filled with 2 layers bionest PVC | Black PVC clear tubing was into 0.02 mm–0.05 mm PVC String and was placed into a certain layer |
| Weight(kg) | 3.86 | 3.86 | 0.35 kg |
| Diameter(in/cm) | 4.5/11.4 | 4.5/11.4 | |
| Height(ft/m) | 3.36/1.024 | 3.36/1.024 | |
| Height/Diameter Ratio | 8.9 | 8.9 | |

TABLE 4

Characteristics of milk parlor wastewater (average of sample analysis)

| Source of washing | Washing times/day | Temperature (° C.) | TSS(g/L) | VSS(g/L) | TCOD (mg/L) | SCOD (mg/l) | TKN (N mg/l) | Phosphorus (P mg/l) | Main component |
|---|---|---|---|---|---|---|---|---|---|
| Milk Parlor | 3 | 65 | 10.5 | 8.7 | 17500 | 3710 | | | Milk |
| Walking way flushing | 3 | 27 | 3.21 | 2.35 | 12000 | 2200 | | | Manure, milk and foods |
| Manure flushing from the cow waiting area | 3 | 27 | 3 | 2.1 | 4180 | 1300 | | | Manure |
| Average(26 of samples) | | 28 | 4.2 | 3.1 | 5200 | 1900 | 200 | 20.1 | Mixed |

The wastewater generated from washing milking equipment was about 8% of the volumetric percentage, but it contributed about 17–22% of the total COD in the mixed wastewater. The average lipid content was 446 mg/l, resulting in an average of 512 mg TCOD/L (9.8% of total COD). The biodegradability of SCOD was 75%–80% based on an aerobic treatment process using a batch operation.

Example 2

Reactor Set Up and Startup

The apparatus was set up according to FIG. 3. A two-stage bioreactor (10 liter each) as shown in FIG. 5, was designed and filled with two bionest bioreactors connected in series by tubing. Each individual bioreactor contained two bionest TABLE 5-continued Basic Parameters of one example of a Bionest Reactor

| | Reactor 1 ($R_1$) | Reactor 2 ($R_2$) | Bionest layer |
|---|---|---|---|
| Total volume(L) | 10 | 10 | |
| Effective Volume(L) | 8.6 | 8.6 | 0.12 |
| Void Volume (L) | 8.48 | 8.48 | |
| Void Volume percentage of effective volume (%) | 98.6 | 98.6 | |

During start-up of the system, each reactor was seeded with 2 liters of anaerobic sludge with TVS/TSS at 32/40 and fed with 6.2 liters of raw wastewater having a SCOD/TCOD of 1280/5460mg/L. The effluent from R2 was constantly recycled at a flowrate of 2 liters/hour for stabilizing seed sludge. Biogas was collected by using airbags and measured by a field gas meter.

After two days of operation, the sludge began to attach to the up-side leaf; after 7 days, biomass started to grow at the backward leaf and the up-side sludge became thicker; and after 12 days of operation, the up-side leaf was completely covered by the sludge. Additionally, an 11 cm sludge layer was formed in the bottom of reactor. As shown in FIG. 12, about 50% SCOD was been removed after a two week start-up period.

Example 3

Operating the Bionest Bioreactor

The bionest system was set up as in Example 2, above. Milk parlor wastewater was collected and stored in a refrigerator (about 4° C.) prior to use. This chilling was for convenience and reproducibility of starting material. In operation there is no need to pre-chill the wastewater. The stored wastewater was fed into reactor directly from the refrigerator. Seeded sludge was collected from an existing anaerobic reactor operated by batch. In order to test the sludge distribution in the bionest bioreactor, and to compare the effects of various operation schedules, sludge from the bioreactor was sampled both at the start of the feeding period and at the end of the feeding period. Sludge sampling was collected from the sampling outlets of various heights. The sludge samples were removed from the bionest bioreactor using a long puncture needle connected with a vacuum ball. A single stage reactor having the same sludge content as in the bionest bioreactor was used as a control system to compare sludge distribution between the two system types. An additional aerated batch reactor was installed and operated for 30 days to measure the wastewater biodegradability.

The bionest bioreactor system was allowed to operate for 6 months in a room with temperature range of 22±2° C. The operation of the system was adjusted to gradually increase of the overall TOCD loading rates from 2.68 g/l/d to 36 g/l/d by using different TCOD concentrations of wastewater and by controlling the flow rate (FIG. 8). At each loading rate, the system was operated to achieve a steady-state for either 3 times the HRT level or 5 days (if HRT was less than 24 hours). FIG. 9 shows the influent TCOD vs. the effluent TCOD (from both the R1 and R2 reactors) over the course of a 145-day operation period.

Example 4

Analysis of System Performance

The dairy wastewater was fed into the system intermittently using a timer controller set at one hour on/off. During each feeding operation, samples of the input (feed) and output (digested effluent) material were taken for the chemical analysis of TS, TVS, TCOD, SCOD, ammonium nitrogen and total phosphorus by following the procedure provided by the Standard Methods (APHA, AWWA, and WPCF, 1989; each of which is incorporated herein in its entirety). Chemical analysis was conducted daily after sampling. The pH values were measured immediately by using an Orion ion analyzer (Model 501). Biogas production was measured using a field gas meter. Methane content was analyzed weekly by using Shimadzu Model GC-3BT gas chromatography connected to a Hewlett-Packard 3390A integrator.

Figure 19:
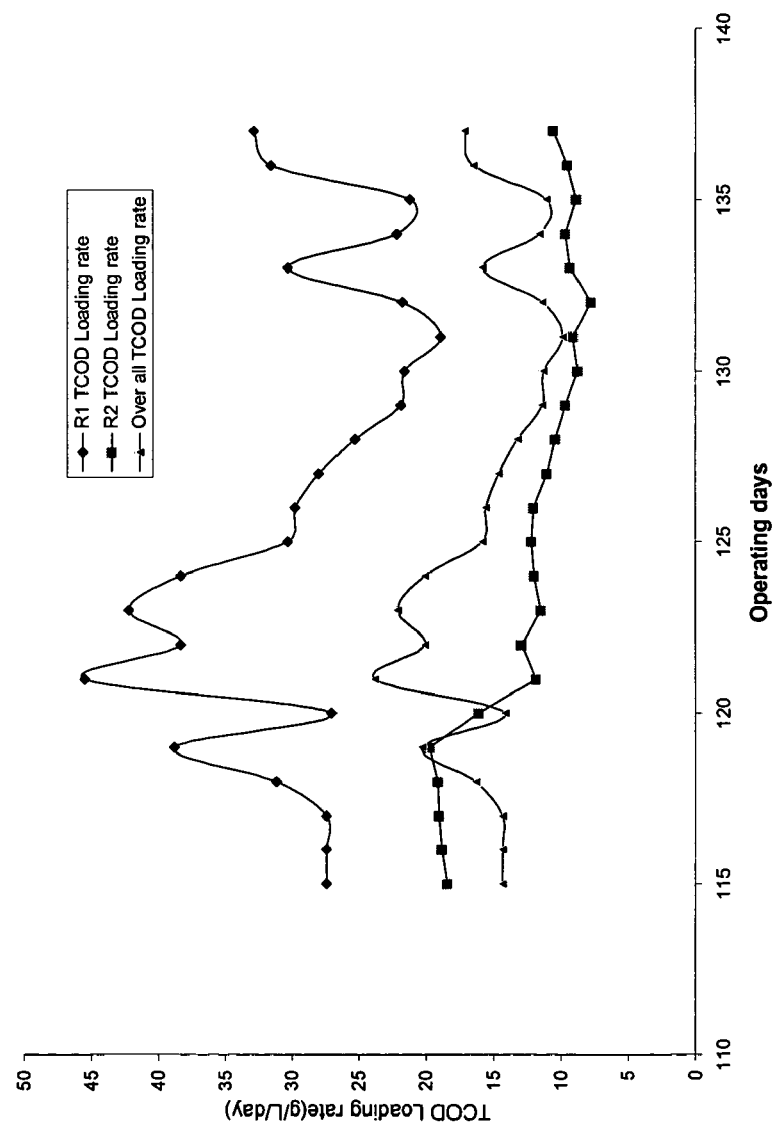
FIG. 19 is a line graph showing TCOD Tolerances With Different Influent Concentration, as measured during Period 8.
Figure 20:
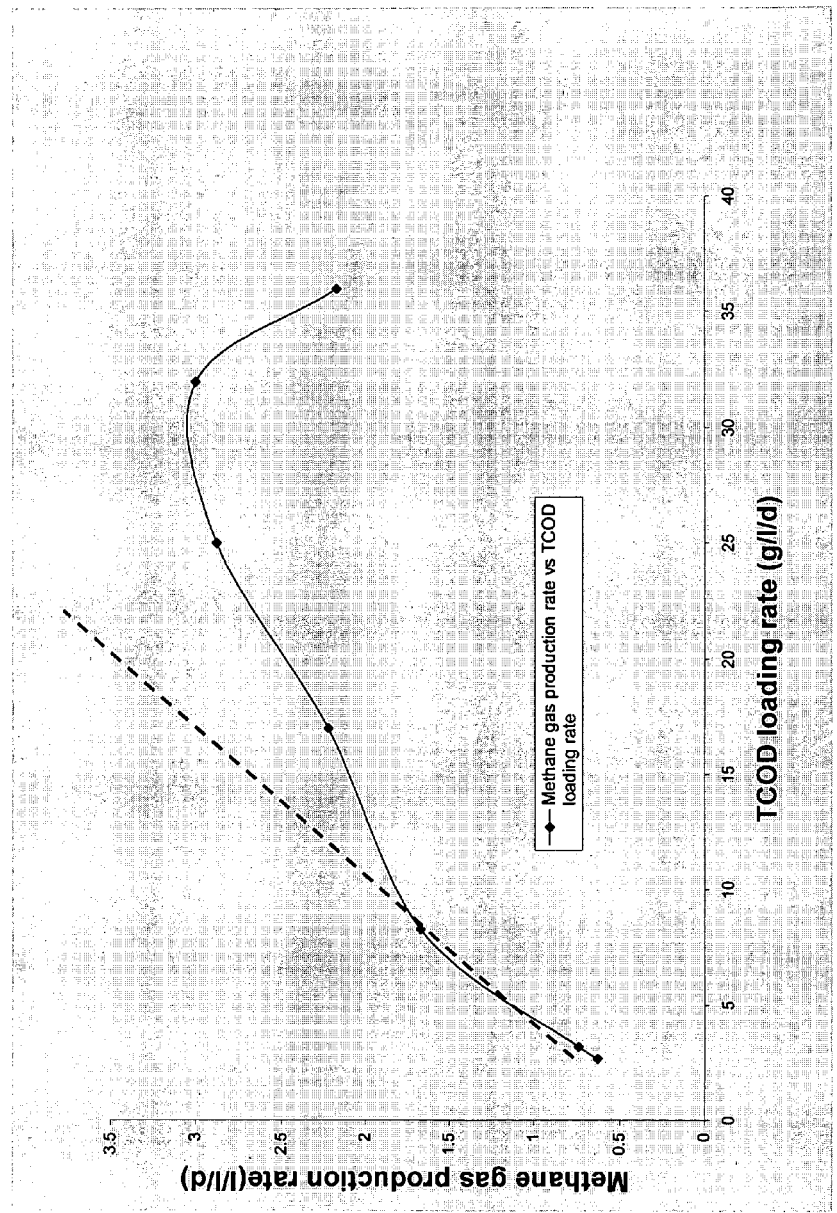
FIG. 20 is a graph showing the rate of methane gas production vs. TCOD loading rate.
Figure 21:
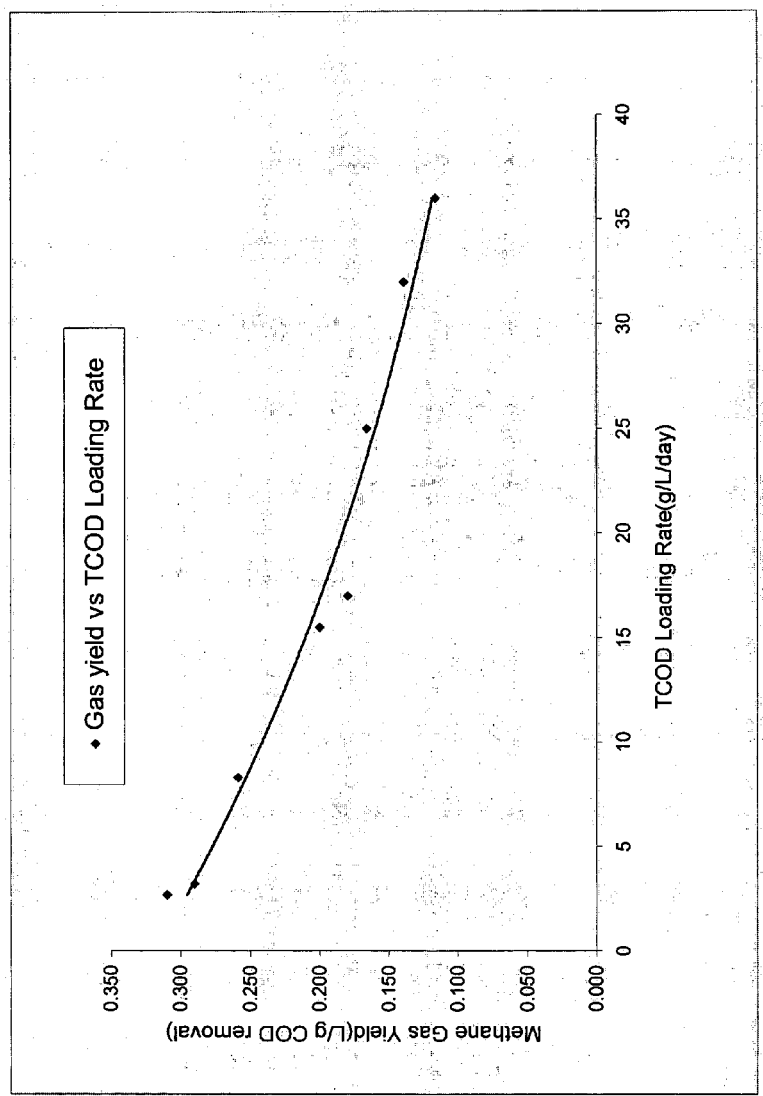
FIG. 21 is a graph showing methane gas yield vs. TCOD loading rate.

TCOD (total COD) loading rates of 2.68 to 36 g/l/d were investigated for the combination of the R1 and R2 (see Table 6 and FIG. 19) bioreactors. The removal efficiency of TCOD was 52%–80%, while the methane gas production rate was 0.63–3.0 l/l/day. These results are comparable with other studies for the anaerobic treatment of dairy wastewater (Ince, 1998, Gavala, et al, 1999; each of which is incorporated herein in its entirety). Methane gas content increased with increasing TCOD loading rate up to about a TCOD of 32 g/l/d, then declined (FIG. 20). Methane gas yield ((l/g COD removal) appeared to decline with an increase in the TCOD loading rate (FIG. 21). Thus, in this example, the methanogenic process may not be complete when TCOD loading rates are increased more than 17 g/l/d and the HRT is less than 15 hours. At the TCOD loading rates of 10–15 g/l/d, methane gas yield of 0.20–0.22 l/g COD and TCOD and SCOD removal efficiency were found to be in the range of 71–75%, and 54–55%, respectively.

TABLE 6

Anaerobic Pretreatment Process (R1 + R2) performance

| Period | TCOD Loading Rate | HRT | R1 + R2 removal efficiency TCOD | R1 + R2 removal efficiency SCOD | Gas Quality Methane | TSS removal efficiency | Methane gas Production rate | Methane Gas Yield L/g COD removal | Effluent pH changing R1 | Effluent pH changing R2 | IN |
|---|---|---|---|---|---|---|---|---|---|---|---|
| Units | g/L/day | Hrs | (%) | (%) | (%) | (%) | L/L/day | | | | |
| 1 | 2.68 | 60 | 75.4 | 45.6 | 76.0 | 88 | 0.63 | 0.310 | 7.3 | 7.3 | 6.8–8.1 |
| 2 | 3.2 | 50 | 80.1 | 59.3 | 74.0 | 80 | 0.74 | 0.290 | 7.2 | 7.3 | |
| 3 | 8.3 | 25 | 77.5 | 56.5 | 72.0 | 79 | 1.67 | 0.259 | 7.1 | 7.3 | |
| 4 | 17 | 15 | 72.7 | 54.4 | 70.0 | 72 | 2.22 | 0.180 | 6.9 | 7.1 | |
| 5 | 25 | 15 | 69.4 | 31.6 | 69.0 | 71 | 2.88 | 0.166 | 6.4 | 6.9 | |

TABLE 6-continued

Anaerobic Pretreatment Process (R1 + R2) performance

| Period | TCOD Loading Rate | HRT | R1 + R2 removal efficiency | | Gas Quality | TSS removal | Methane gas Production | Methane Gas Yield | Effluent pH changing | | |
|---|---|---|---|---|---|---|---|---|---|---|---|
| | | | TCOD | SCOD | Methane | efficiency | rate | L/g COD | R1 | R2 | IN |
| Units | g/L/day | Hrs | (%) | (%) | (%) | (%) | L/L/day | removal | | | |
| 6 | 32 | 11.5 | 67.4 | 36.0 | 63.0 | 69 | 3.00 | 0.139 | 6.3 | 6.6 | |
| 7 | 36 | 10 | 52.0 | 28.9 | 57.0 | 62 | 2.17 | 0.116 | 4.5 | 6.4 | |

Example 5

Measurement of Process Stability

In order to observe process stability, the system was fed with wastewater of different TCOD and SCOD concentrations. The system was operated at a constant HRT of 15 hours. As shown in FIG. 19, it was found that although the influent TCOD fluctuated in the range of 5300–12000 mg/l, the effluent TCOD measurements from R1 and R2 were relatively stable.

Example 6

Calculation of Surface Area and Porosity

As mentioned earlier, the bionest structure was made of waste material of PVC tubing, cut into long strips. The long string shape material was twisted and pressed in order to increase total surface area in a given volume (FIG. 1). The high surface to volume ratio of the bionest structure contributes to its effectiveness in wastewater treatment. The following procedure was performed to determine the surface area and the porosity of the system.

The area of the reactor wall can be calculated by the following equation:

$$A_{reactor} = \pi \cdot d \cdot H = \pi \cdot 0.114 m \cdot 0.9 m = 0.322 m^2$$

Where $A_{reactor}$ is the area of the reactor wall;
d is the diameter of the reactor;
H is the height of the reactor.

The surface area of the bionest can be estimated by using the following equation:

$$A_{nest} = 2w \cdot l$$

Where w is the width of the PVC leaf; l is the length of the leaf. Because the nest provided two sides for the attachment of microorganisms, the surface area calculated for one side is then doubled. The specific area per weight of bionest can be calculated according to the parameters provided in Table 7:

$$\frac{A_{nest}}{kg} = \frac{0.33 \, cm \cdot 1000 \, m \cdot 2 \cdot 3}{0.2 \, kg} = 99 \frac{m^2}{kg}$$

The specific surface areas the twisted bionest provided can be calculated by using the following equation:

$$\frac{S}{V} = 33,000 \frac{m^2}{m^3}$$

The Voidage can be calculated as:

$$Voidage = \frac{V1}{V2} \cdot 100\%$$

Where $V_1$ is media actual volume;
$V_2$ is the nest replaced the water volume.
Using the above calculations, it was found that the bionest provides 33,000–80,000 $m^2/m^3$ specific area, which depends on the nest density and the leaf thickness.

The table below is a comparison with traditional media.

TABLE 7

Surface-to-Volume Ratios of Selected Fixed Film Support Media

| Process/Carrier Type | Media Voidage (%) | S/V (m2/m3) | Source: |
|---|---|---|---|
| Downflow Fixed Film | 50–95% | 70–100 | Malina 1992 |
| Upflow Modular Medium | 90–95% | 85–100 | Malina 1992 |
| Upflow Random Medium(9–15 cm) | 90–95% | 90–200 | Malina 1992 |
| Expanded Bed(0.3 mm) | 45–55% | 9000–11000 | Malina 1992 |
| Fluidized Bed(0.3 mm) | 50–300% | 4000–10000 | Malina 1992 |
| Bionest | >700% | 33,000–80,000 | Present study |

Example 7

Analysis of the Bionest Reactor Sludge Layer

Figure 14:
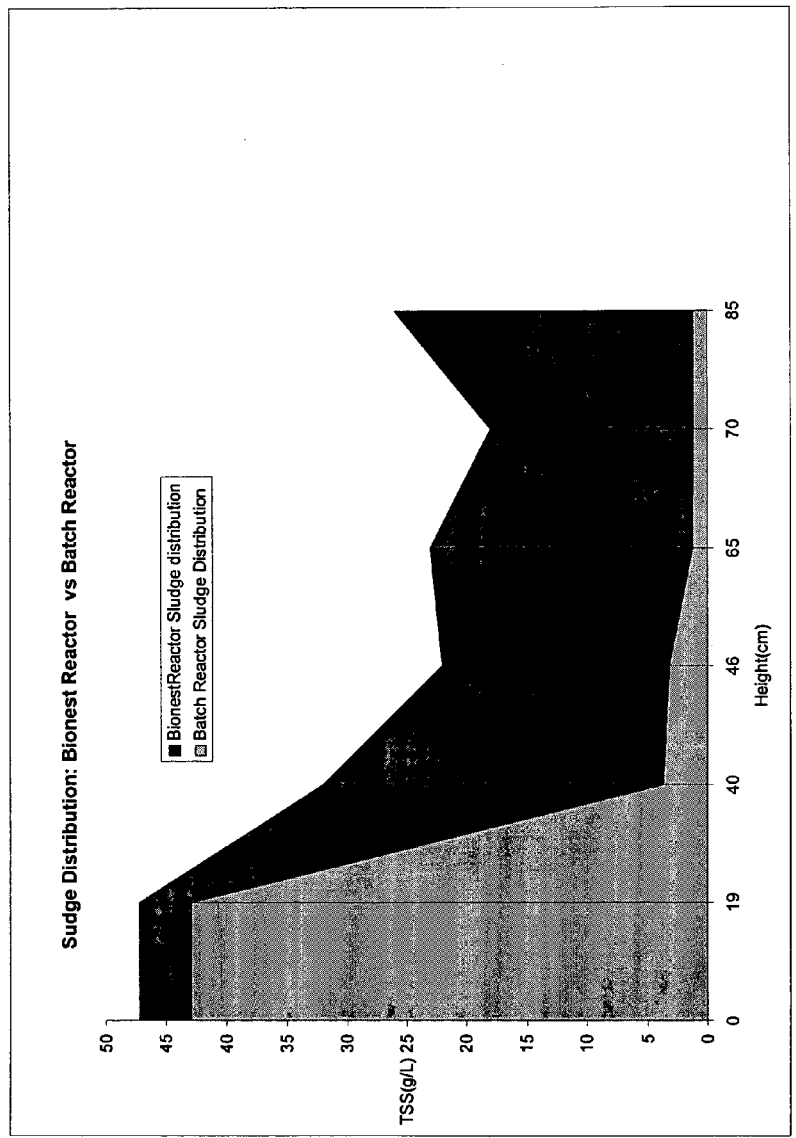
FIG. 14 is a line graph showing the Sludge Distribution in a bionest reactor vs. a batch reactor without a bionest installation.

The sludge layer at the bottom portion of the bioreactor gradually increased with operation time. After 72 days of operation, the sludge layer in R1 was fully developed from the bottom to the top of the reactor; after 81 days of operation, the sludge layers in R2 were fully developed. The sludge layers in both R1 and R2 were clearly distinguished in three layers by color differences with the bionest installing positions. Densities were measured by using concentrations of TSS and TVS confirmed the differences. At a height of 0–19 cm, the sludge layer had a TSS concentration of 43-47 g/l; at the height of 40–65 cm, sludge layers had a concentration of 23–32 g/l; at the height of 70–85 cm, the sludge layers had a TSS concentration of 18–27 g/l. Inside the bionest, the sludge concentration was in the range of 26–30 g/l. The average VS/TSS ratios in the three layers (from bottom to the top) were 84.1%, 80.3% and 78.0%, respectively. During the entire operation period, no clogging or foaming occurred. FIG. 14 shows the sludge distribution in the reactor 1 compared with that in a same size of reactor without the bionest installation.

Example 8

Analysis of Methane Gas Production

The methane produced from the system can be utilized as a biogas for energy needs. Accordingly, the production of methane was examined. FIG. 20 shows that methane gas production increased rapidly with increased TCOD loading rate up to a TCOD loading rate of 10 g/l/d. At about 33 g/l/d TCOD, methane gas production (l/l/d) decreased.

Figure 22:
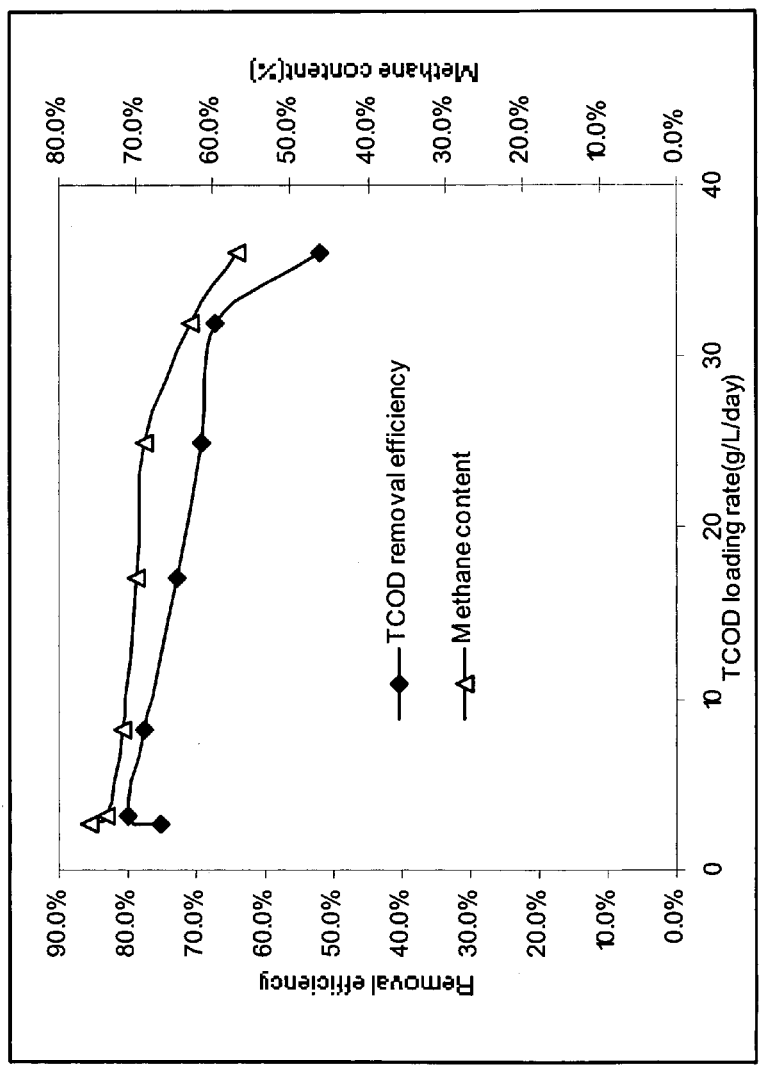
FIG. 22 is a line graph showing the TCOD removal efficiency and methane content vs. TCOD loading rate.

FIG. 21 shows the methane gas yield (l/g COD removal) per TCOD loading rate (g/l/d). As TCOD increased, methane gas yield steadily decreased. The TCOD removal efficiency and methane content vs. TCOD loading rates is shown in FIG. 22. The decrease in TCOD removal efficiency was paralleled by a decrease in methane content as TCOD rates per day increased.

Example 9

Additional Aerobic Post Treatment Bioreactor

Optionally, an aerobic bioreactor can be attached to the system in series, after the anaerobic bionest reactor(s). An example of a system that includes an aerobic bioreactor is shown in FIG. 4. Air 36 was bubbled through the third aerobic reactor (R3) through an inlet 37 near the bottom of the reactor. A bionest structure 40 was present. The effluent from anaerobic reactor R2 entered the aerobic reactor through inlet 38. A media layer 39 was present. Analysis of parameters from the aerobic post treatment reactor shown in FIG. 4 is detailed in FIG. 23. The removal efficiency of TCOD, SCOD, TSS, TN (total nitrogen) and P (Phosphorus) is indicated for each period of different TCOD loading rates (1–8).

While the described embodiment represents various preferred embodiment, it is to be understood that modifications will occur to those skilled in the art without departing from the spirit of the invention. The scope of the invention is therefore to be determined solely by the appended claims. Each of the references cited herein is incorporated by reference in its entirety.

REFERENCES

Alphenaar, A. R. A., & Lettinga, G. (1993). Anaerobic digestion of long-chain fatty acids in UASB and expanded granular sludge bed reactors. *Process Biochemistry*, 28(8), 527–537.

APHA, AWWA and WEF. (1989). *Standard Methods for the Examination of Water and Wastewater* (17th ed.). Washington, D.C.: American Public Health Association.

Batstone, D. J., & Keller, J. (2001). Variation of bulk properties of anaerobic granules with wastewater type. *Water Research*, 35(7), 1723–1729.

Bellouti, M., Alves, M. M., Novais, J. M., & Mota, M. (1997). Flocs vs granules: differentiation by fractal dimension. *Water Research*, 31(5), 1227–1231.

Chernicharo, C. A. L., & Cardoso, M. dos Reis. (1999). Development and Evaluation of a Partitioned Upflow Anaerobic Sludge Blanket (UASB) Reactor for the Treatment of Domestic Sewage from Small Villages. *Wat. Sci.and Tech.*, 40(8), 107–113.

Cordoba, R. P., Fiancese, A. P., & Sinerize, F. (1995). Improved performance of a hybrid design over an anaerobic filter for the treatment of dairy wastewater at laboratory scale. *Journal of Fermentation and Bioengineering*, 79(3), 270–272.

Driessen, W., & Yspeert, P. (1999). Anaerobic Treatment of Low, Medium and High Strength Effluent in the Agro-industry. *Wat.Sci. and Tech.*, 40(8), 221–228.

Fernandez, J. M., Francisco, O., Méndez, R., & Lema, J. M. (2001). Anaerobic treatment of fibreboard manufacturing wastewaters in a pilot scale hybrid usbf reactor. *Wat. .Res.*, 35(17), 4150–4158.

Frankin, R. J. (2001). Full-scale Experiences with Anaerobic Treatment of Industrial Wastewater. *Wat. Sci. Tech.*, 44(8), 1–6.

Gavala, H. N., Kopsinis, H., Skiadas, I. V., Stamatelatou, K., & Lyberatos, G. (1999). Treatment of Dairy Wastewater Using an Upflow Anaerobic Sludge Blanket Reactor. *Journal of Agricultural Engineering Research*, 73(1), 59–63.

Gavrilescu, M. 2002. Engineering concerns and new developments in anaerobic waste-water treatment. *Clean Techn Environ Policy*, 3, 346–362.

Habets, L. H. A., Engelaar, A. J. H. H., & Groeneveld, N. Anaerobic treatment of inuline effluent in an internal circulation reactor. *Water Science and Technology*, 35(10), 189–197.

Hawkes, F. R., Donnelly, T., & Anderson, G. K. (1995). Comparative performance of anaerobic digesters operating on ice-cream wastewater. *Wat. Res.* 29(2), 525–533.

Hills, D. J., & Nakano, K. (1984). Effect of particle size on anaerobic digestion of tomato solid waste. *Agric. Wastes*, 10, 285–295.

Ince, 0. (1998). Performance of a two-phase anaerobic digestion system when treating dairy wastewater. *Wat. Res.*, 32(9), 2707–2713.

Jhung, J. K., & Choi, E. (1995). A comparative study of UASB and anaerobic fixed film reactors with development of sludge granulation. *Wat. Res.*, 29(1), 271–277.

Lens, P. N. L., Bosch, M. C. van den, Hulshoff, P. L. W., & Lettinga, G. (1998). Effect of staging on volatile fatty acid degradation in a sulfidogenic granular sludge reactor. *Water Research*, 32(4), 1178–1192.

Lettinga, G, van Velsen, A. F. M., Hobma, S. W., de Zeeuw, W., & Klapwijk, A. (1980). Use of the Upflow Sludge Blanket (USB) Reactor concept for Biological Wastewater Treatment. *Biotechnology and Bioengineering*, 22, 699–734.

Lettinga, G., Hulshoff, P. L. W. (1991). UASB-process design for various types of wastewaters. *Water Sci. Technol.*, 24(8), 87–107.

Lettinga, G., Rebac, S., & Zeeman, G. (2001). Challenge of psychrophilic anaerobic wastewater treatment. *Trends in Biotechnology*, 19(9), 363–370.

Letting, G., Field J., van Lier J., Zeeman G., & Hulshoff, P. L. W. (1997). Advanced anaerobic wastewater treatment in the near future. *Wat.Sci.and Tech.*, 35(10), 5–12.

Malina, J. F., Jr., & Pohland, F. G. (1992). Design of anaerobic processes for treatment of industrial and municipal wastes, *Water Quality Management Library*, 7, 85.

Marin P., Alkalay D., Guerrero L., Chamy R., & Schiappacasse, M. C. (1999). Design and Startup of an Anaerobic Fluidized Bed Reactor. *Wat. Sci. Tech.*, 40(8), 63–70.

Metcalf & Eddy, Inc. (1991). *Wastewater Engineering: Treatment, Disposal, and Reuse* (3rd ed.). New York: McGraw-Hill.

Miron, Y., Zeeman, G., van Lier, J. B., & Lettinga, G. (2000). The role of sludge residence time in the hydrolysis of lipids, carbohydrates and proteins during the anaerobic treatment of domestic sewage. *Water Res,.* 34(5), 1705–1713.

Nadais, H., Capela, I., Arroja, L., & Duarte, A. (2001). Effects of organic, hydraulic and fat shocks on the performance of UASB reactors with intermittent operation. *Water Sci. Techno.,* 44 (4), 49–56.

Pereboom, J. H. F., & Vereijken, T. L. F. M. Methanogenic granule development in full scale internal circulation reactors. *Water Science and Technology,* 30(8), 9–21.

Pereboom, J. H. F. (1994). Size distribution model for methanogenic granules from full scale UASB and IC reactors. *Water Science and Technology,* 30(12), 211–221.

Perle, M., Kimchie, S., & Shelef, G. (1995). Some biochemical aspects of the anaerobic degradation of dairy wastewater. *Water Research,* 29(6), 1549–1554.

Petruy, R., & Lettinga, G. (1997). Digestion of a milk-fat emulsion, *Bioresource Technology,* 61(2), 141–149.

Rinzema, A. (1988). *Anaerobic Treatment of Wastewater with High Concentrations of Lipids or Sulphate.* Ph.D. Thesis, Wageningen, Agric. Univ., The Netherlands.

Sayed, S., van Campen, L., & Lettinga, G. (1987). Anaerobic treatment of slaughterhouse waste using a granular sludge UASB reactor. Biol. Wastes, 21(1), 11–28.

Uyanik, S., Sallis, P. J., & Anderson G. K. (2002). The effect of polymer addition on granulation in an anaerobic baffled reactor (ABR). Part I: process performance. *Wat. Res.,* 36(4), 933–943.

van Langerak, E. P. A., Gonzalez-Gil, G., van Aelst, A., van Lier, J. B., Hamelers, H. V. M., & Lettinga, G. (1998). Effects of high calcium concentrations on the development of methanogenic sludge in upflow anaerobic sludge bed (UASB) reactors. *Wat. Res.,* 32(4), 1255–1263.

van Lier, J. B., Rebac, S., & Lettinga, G. (1997). High-rate anaerobic wastewater treatment under psychrophilic and thermophilic conditions. *Water Science and Technology,* 35(10), 199–206.

Vartak, D. R., Engler, C. R, McFarland, M. J., & Ricke, S. C. (1997). Attached-film media performance in psychrophilic anaerobic treatment of dairy cattle wastewater. *Bioresource Technology,* 62(3), 79–84.

Vartak, D. R., Engler, C. R., Ricke, S. C., Byers, F. M., & McFarland, M. J. (1998). Mesophilic performance of attached-film reactors subject to low temperature stress. *Trans ASAE,* 41(5), 1463–1468.

Vidal, G., Carvalho, A., Méndez, R., & Lema, J. M. (2000). Influence of the content in fats and proteins on the anaerobic biodegradability of dairy wastewaters. *Bioresource Technology,* 74(3), 231–239.

Vieira, S. M. M., & Garcia, A. D. Jr. (1992). Sewage treatment by UASB reactor: Operation and recommendations for design and utilization. *Water Sci. Technol.,* 25(7), 143–158.

Wiegant, W. M. (2001). Experiences and potential of anaerobic wastewater treatment in tropical regions. *Water Sci. Technol,* 44(8), 107–113.

Wirtz, R. A., & Dague, R. R. (1997). Laboratory studies on enhancement of granulation in the anaerobic sequencing batch reactor. *Water Science and Technology,* 36(4), 279–286.

Yang, Y. P. (1994). Treatment of milk powder wastewater with lipids. Internal Report. Agricultural University of Wageningen, Wageningen, the Netherlands.

Yu, H. Q., Tay, J. H., & Fang, H. H. P. (2001). The roles of calcium in sludge granulation during uasb reactor start-up, *Wat. Res.,* 35(4), 1052–1060.

Yu, H. Q., Fang, H. H. P., Tay, J. H. (2001). Enhanced sludge granulation in upflow anaerobic sludge blanket (UASB) reactors by aluminum chloride. *Chemosphere,* 44(1), 31–36.

Zeeman G. and G. Lettinga. (1999). The role of anaerobic digestion of domestic sewage in closing the water and nutrient cycle at community level. *Water Sci. Technol,.* 39(5), 187–194.

Zeeman, G., Sanders, W. T. M., Wang, K. Y., & Lettinga, G. (1997). Anaerobic treatment of complex wastewater and waste activated sludge—application of an upflow anaerobic solid removal (UASR) reactor for the removal and pre-hydrolysis of suspended COD. *Wat. Sci. and Tech.,* 35(10), 121–1128.

What is claimed is:

1. A biological reactor for processing wastewater comprising at least one pollutant, the reactor comprising a housing and a nest material, wherein the housing comprises a passage for flow of wastewater, the passage having a cross-sectional area and an axis parallel to a direction of flow, wherein nest material is confined within a nest space in at least one position along the axis, and wherein the nest material comprises a substantially planar filamentous structure that provides a surface for attachment of biomass while permitting flow of wastewater through the nest space, wherein said nest material has a surface to volume ratio of at least about 10,000.

2. The reactor of claim 1, the nest material having a surface to volume ratio between about 30,000 and about 100,000.

3. The reactor of claim 1, wherein the nest material comprises polyvinylchloride.

4. The reactor of claim 1, wherein the nest material comprises a thickness of less than about 100 microns.

5. The reactor of claim 4, wherein the thickness is less than about 50 microns.

6. The reactor of claim 1, wherein the nest material extends through substantially all of the cross sectional area of the passage within the nest space.

7. The reactor of claim 1, wherein the nest material retains substantially constant biomass at a hydraulic retention time between 10 and 30 h.

8. The reactor of claim 1, wherein the nest material retains substantially constant biomass in presence of a high lipid wastewater.

9. The reactor of claim 1, wherein the biomass exists in association with the nest material at a concentration of at least about 10 g/l.

10. The reactor of claim 1, wherein the nest material is arranged in the nest space to create turbulence in wastewater passing through said nest space.

11. The reactor of claim 1, wherein the biomass comprises anaerobic bacteria.

12. The reactor of claim 1, comprising nest material confined in nest spaces at two or more positions along the axis.

13. The reactor of claim 12, wherein biological processing of a pollutant in the wastewater substantially occurs in two or more steps, each of said steps being predominant in one of the two or more nest spaces positioned along the axis.

14. The reactor of claim 13, wherein processing of a pollutant comprises at least an acidogenic step and a methanogenic step, and wherein said acidogenic step is predominant in a first nest space and said methanogenic step is predominant in a second nest space.

15. The reactor of claim 1, having an overall void volume of at least about 85%.

16. The reactor of claim 1, having an overall void volume of at least about 90%.

17. The reactor of claim 1, comprising a bank of two or more housings, wherein wastewater flows serially along a flow path through each housing in the bank.

18. The reactor of claim 17, wherein each housing comprises at least one nest space.

19. The reactor of claim 17, further comprising a plurality of banks of housings, wherein said banks are arranged to permit parallel flow of wastewater in said banks, permitting multiplex passage of a large volume of wastewater through the reactor, such that substantially all of said wastewater passes through said reactor with a uniform hydraulic retention time.

20. The reactor of claim 1, wherein said reactor has an efficiency of removal of one or more organic pollutants, and wherein said efficiency is at least about 50% chemical oxygen demand (COD) removal at a loading rate of over 10 g/l/d.

21. The reactor of claim 20, wherein said reactor has an efficiency of removal of one or more organic pollutants, and wherein said efficiency is at least about 40% chemical oxygen demand (COD) removal at a loading rate of over 20 g/l/d.

22. The reactor of claim 20, wherein the efficiency is between 50% and 85% COD removal at a loading rate of over 15 g/l/d.

23. The reactor of claim 1, wherein biological processing of a wastewater therein produces methane.

24. The reactor of claim 23, wherein production of methane is at least 1 l/l/d at 22 degrees and 10 g/l/d.

25. The reactor of claim 24, wherein production of methane is at least 2 l/l/d.

26. The reactor of claim 24, wherein production of methane results in an energy output/input ratio of 3:1 to 7:1.

27. The reactor of claim 24, wherein production of methane occurs at a temperature below 25 degrees C.

28. A biological reactor for processing wastewater comprising at least one pollutant, the reactor comprising a housing and a nest material, wherein the housing comprises a passage for flow of wastewater, the passage having a cross-sectional area and an axis parallel to a direction of flow, wherein nest material is confined within a nest space in at least one position along the axis, wherein the nest material comprises a structure that provides a surface for attachment of biomass while permitting flow of wastewater through the nest space, and wherein a surface to volume ratio of the nest material is at least about 10,000.

* * * * *

UNITED STATES PATENT AND TRADEMARK OFFICE
CERTIFICATE OF CORRECTION

Figure 17:
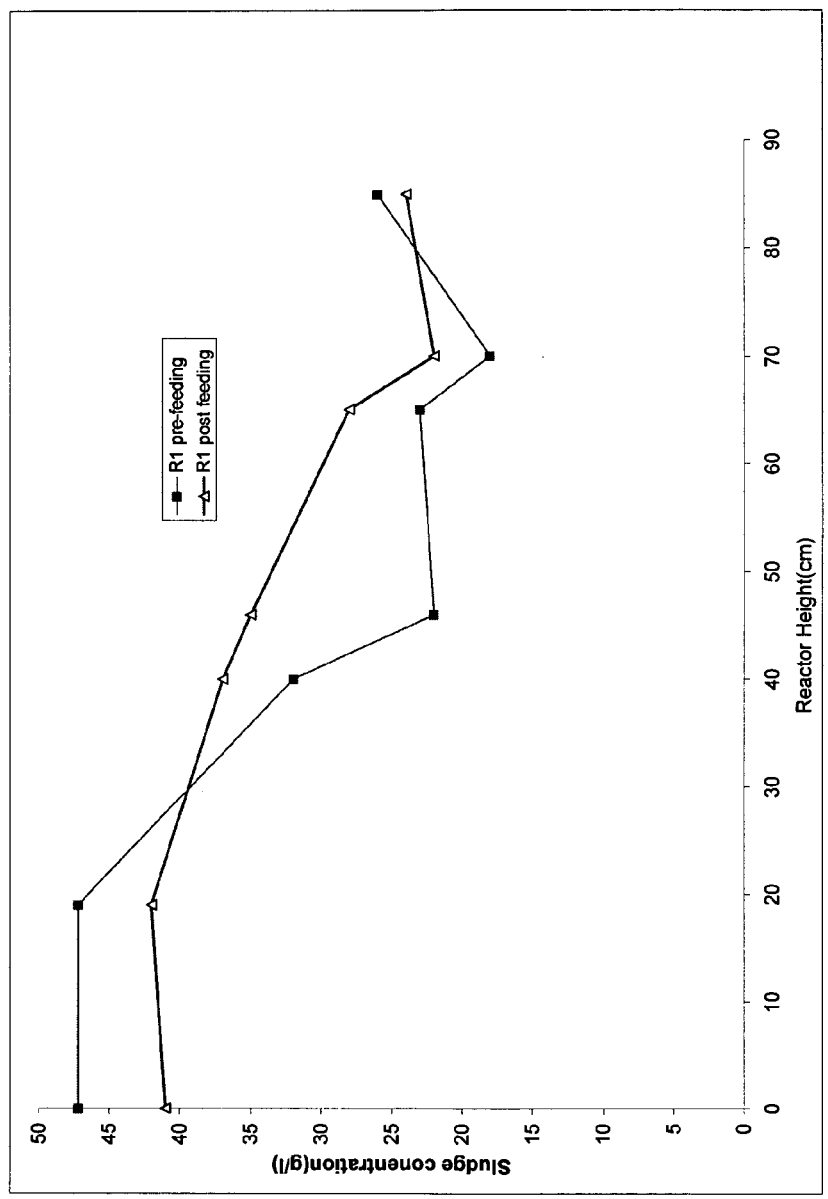
FIG. 17 is a graph which compares Sludge Distribution With One Hour On/Off Feeding Operation
Figure 18:
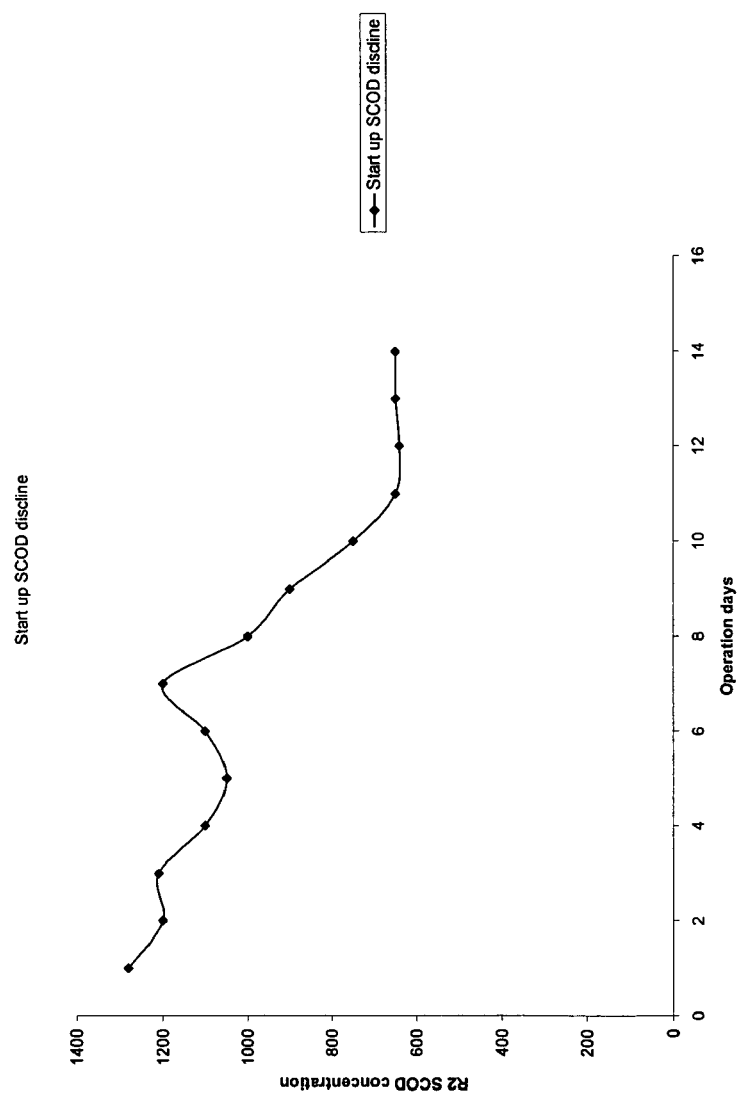
FIG. 18 is a line graph showing SCOD Reduction During the Startup Period.

PATENT NO. : 7,226,539 B2  
APPLICATION NO. : 10/858819  
DATED : June 5, 2007  
INVENTOR(S) : Liangjie Dong and Ping-Yi Yang It is certified that error appears in the above-identified patent and that said Letters Patent is hereby corrected as shown below:

On Title Page
    On Page 1, Col. 1 item 73 (Assignee), line 1, please delete "Honolulu, HI" and insert --Office of Technology Transfer & Economic Development, 2800 Woodlawn Drive, Suite 280, Honolulu, HI 96822--, therefor.
    On Page 2, Col. 1 item 56 (Other Publications), line 5, please delete "(1995) ." and insert --(1995).--, therefor.
    On Page 2, Col. 2 item 56, line 53, please Delete "concentratoins" and insert --concentrations--, therefor.
    On Page 2, Col. 2 item 56 (Other Publications), line 61, please delete "PCT/USUS04/17307" and insert --PCT/US04/17307--, therefor.
    On sheet 7 of 23 (below X-axis) (Fig. 7), line 1, please delete "Reator" and insert --Reactor--, therefor.
    On sheet 14 of 23 (Fig. 14), line 1, please delete "Sudge" and insert --Sludge--, therefor.
    On sheet 17 of 23 (Y-axis) (Fig. 17), line 1, please delete "conentration" and insert --concentration--, therefor.
    Col. 2, line 5, please delete "Leffinga," and insert --Lettinga,--, therefor.
    Col. 2, line 18, please delete "(COD>2500 mg/l )" and insert --(COD>2500 mg/l)--, therefor.
    Col. 5, line 42, after "Operation", please insert -- . --.
    Col. 10, line 19, please delete "45°C." and insert --45° C., or 50° C.--, therefor.
    Col. 10, line 30, please delete "methane production methane" and insert -- methane production --, therefor.
    Col. 10, line 65, please delete "g/lid." and insert --g/l/d.--, therefor.
    Col. 13, line 24 (approx.), please delete "TN__influent" and insert -- $TN_{influent}$ --, therefor.
    Col. 13, line 63, please delete "hydrolyis" and insert -- hydrolysis --, therefor.
    Col. 19, line 47 (approx.), please delete "TOCD" and insert -- TCOD --, therefor.
    Col. 20, line 40 (approx.), please delete "((e/g COD removal)" and insert -- (e/g COD removal) --, therefor.
    Col. 21, line 66, after "areas", please insert --of--, therefor.
    Col. 24, line 59, please delete "Letting," and insert -- Lettinga, --, therefor.
    Col. 24, line 14, please delete "usbf" and isnert -- USBF --, therefor.

UNITED STATES PATENT AND TRADEMARK OFFICE
CERTIFICATE OF CORRECTION

PATENT NO.       : 7,226,539 B2
APPLICATION NO.  : 10/858819
DATED            : June 5, 2007
INVENTOR(S)      : Liangjie Dong and Ping-Yi Yang It is certified that error appears in the above-identified patent and that said Letters Patent is hereby corrected as shown below:

Col. 26, line 5, please delete "uasb" and insert -- UASB --, therefor.

Signed and Sealed this

Twenty-seventh Day of November, 2007

JON W. DUDAS
*Director of the United States Patent and Trademark Office*